US007916712B2

(12) United States Patent
Hirano et al.

(10) Patent No.: US 7,916,712 B2
(45) Date of Patent: *Mar. 29, 2011

(54) COMMUNICATION SYSTEM, MOBILE TERMINAL AND ACCESS ROUTER

(75) Inventors: Jun Hirano, Kanagawa (JP); Keigo Asou, Kanagawa (JP)

(73) Assignee: Panasonic Corporation, Osaka (JP)

( * ) Notice: Subject to any disclaimer, the term of this patent is extended or adjusted under 35 U.S.C. 154(b) by 937 days.

This patent is subject to a terminal disclaimer.

(21) Appl. No.: 10/585,315

(22) PCT Filed: Jan. 7, 2005

(86) PCT No.: PCT/JP2005/000140
§ 371 (c)(1),
(2), (4) Date: Jul. 3, 2007

(87) PCT Pub. No.: WO2005/067228
PCT Pub. Date: Jul. 21, 2005

(65) Prior Publication Data
US 2008/0019380 A1    Jan. 24, 2008

(30) Foreign Application Priority Data
Jan. 7, 2004   (JP) ................................. 2004-002473

(51) Int. Cl.
*H04Q 7/24* (2006.01)
(52) U.S. Cl. ........................................ 370/349; 370/352
(58) Field of Classification Search .................. 370/328, 370/331, 332, 352, 392, 349, 440, 475; 455/422.1, 455/440
See application file for complete search history.

(56) References Cited

U.S. PATENT DOCUMENTS

| | | | | |
|---|---|---|---|---|
| 2002/0154638 A1* | 10/2002 | Shahrier et al. | ............... | 370/400 |
| 2003/0026241 A1* | 2/2003 | Ono et al. | .................... | 370/349 |
| 2003/0103496 A1* | 6/2003 | Lakshmi Narayanan et al. | ............................. | 370/352 |
| 2004/0156347 A1* | 8/2004 | Kim | .............................. | 370/338 |
| 2008/0159221 A1* | 7/2008 | Hirano et al. | ................. | 370/331 |

OTHER PUBLICATIONS

Rajeev Koodli, "Fast Handovers for Mobile IPv6," draft-ietf-mobileip-fast-mipv6-08, Mobile IP Working Group, Internet Draft, 38 pages total, Oct. 10, 2003.
T. Narten, et al., "Neighbor Discovery for IP Version 6 (IPv6)," RFC2461, Network Working Group, pp. 1-93, Dec. 1998.
PCT International Search Report dated Apr. 19, 2005.
T. Narten, et al.; "Neighbor Discovery for IP Version 6 (IPv6)," RFC: 2461, Dec. 1998.
B. Koh, et al.; "Dynamic Inter Home Agent Protocol," Jun. 2004, <draft-Koh-dihap-00>, Internet-Draft.
C. NG, et al.; "Host/Edge Multihoming Problem Statement," Jul. 2004, <draft-ng-edge-multihoming-problem-statement-00>.
R. Koodli; "Fast Handovers for Mobile IPv6," Oct. 10, 2003, Internet-Draft, <draft-ietf-mobileip-fast-mipv6-08.txt>.

* cited by examiner

*Primary Examiner* — Nghi H Ly
*Assistant Examiner* — Myron Wyche
(74) *Attorney, Agent, or Firm* — Dickinson Wright PLLC

(57) ABSTRACT

A new technique is disclosed, by which a mobile terminal executing handover between subnets can quickly transmit packet to outside immediately after the handover. According to this technique, MN (mobile node) 10 executing the handover requests an external transmission address relating to a subnet connected after the handover (a link local address of an access router or of a default router belonging to the subnet after the handover) when transmitting an FNA message to NAR31 connected immediately after the handover. In response to the request, NAR acquires the external transmission address and transmits the external transmission address to MN by sending an RA message to MN. MN sets up the external transmission address acquired before the handover to the packet to be transmitted after the handover.

15 Claims, 22 Drawing Sheets

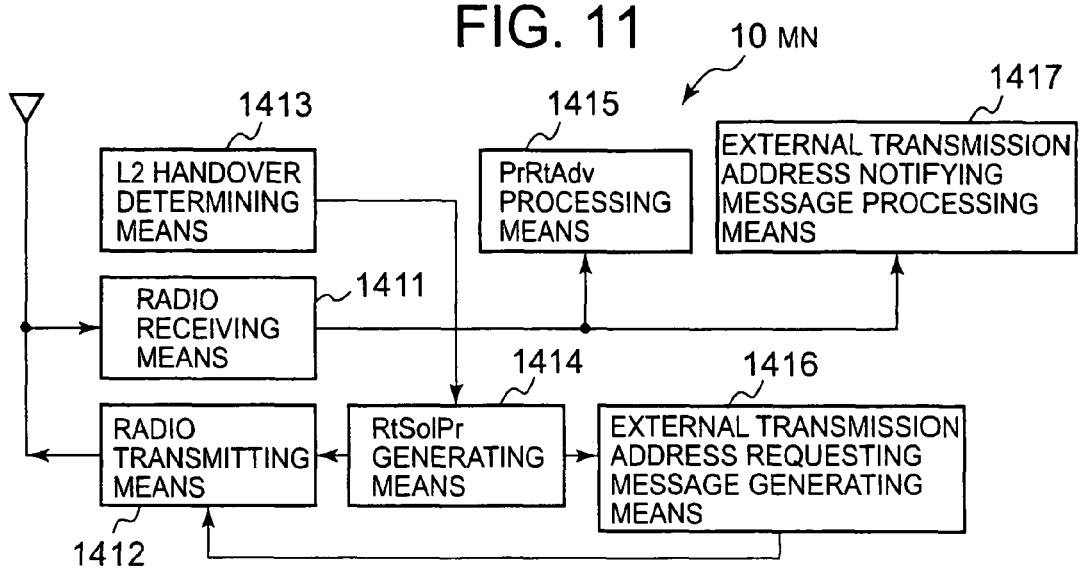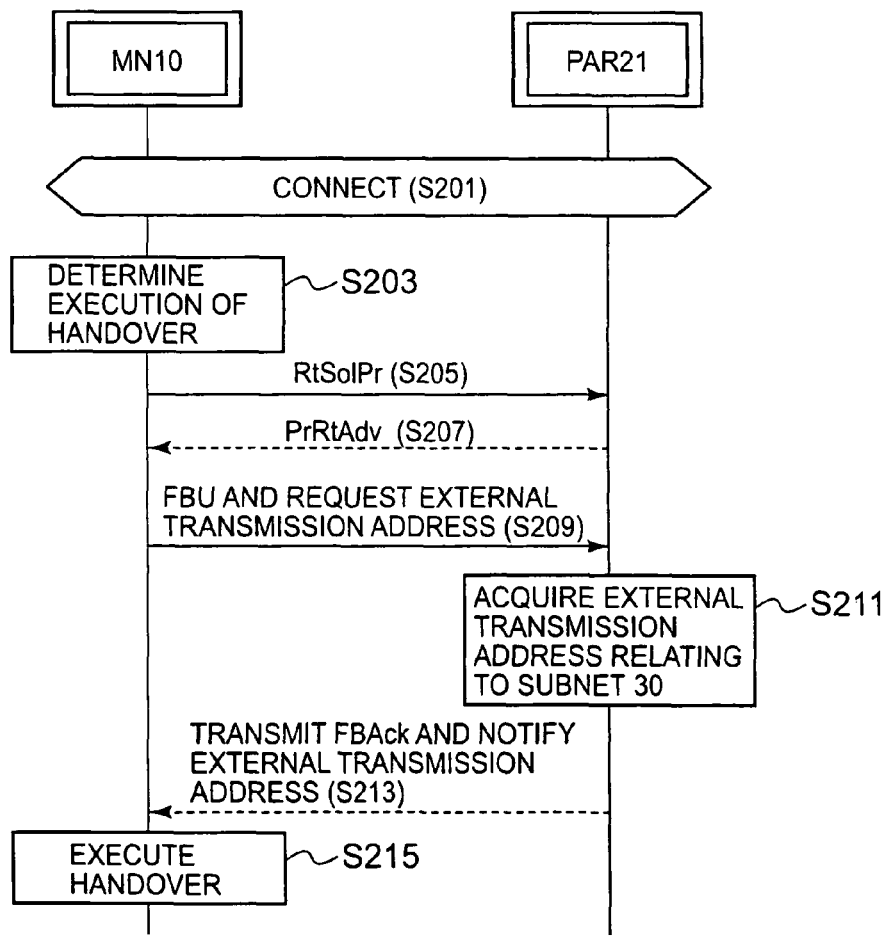

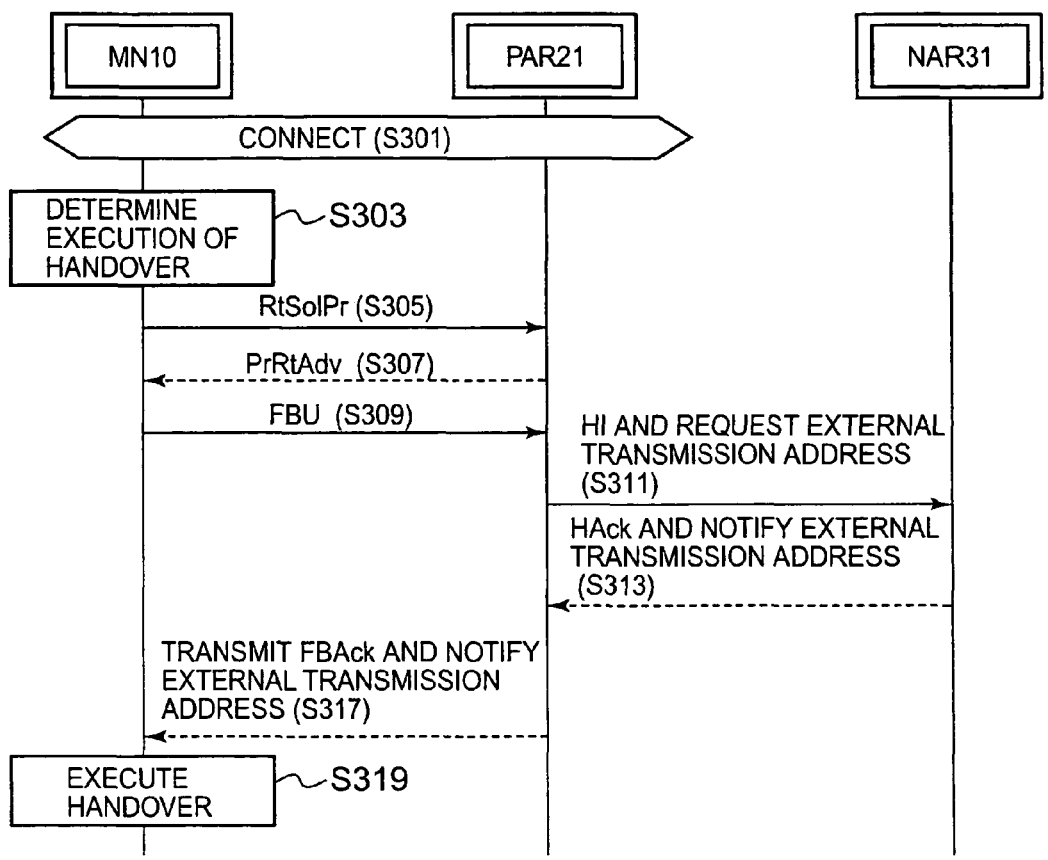
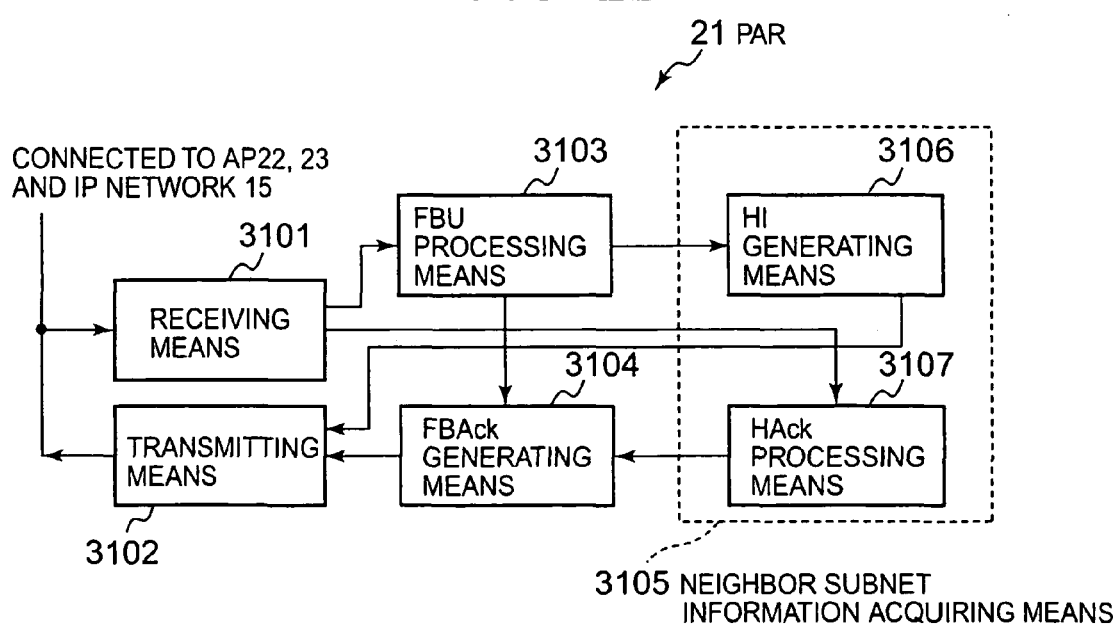

FIG. 43 PRIOR ART (ROUTING TABLE BEFORE HANDOVER)

| DESTINATION | GATEWAY |
|---|---|
| ... | ... |
| DEFAULT ROUTER | LINK LOCAL ADDRESS OF PAR21 |
| LINK LOCAL ADDRESS OF PAR21 | MAC ADDRESS OF PAR21 |
| ... | ... |

FIG. 44 PRIOR ART (PACKET FROM MN10 TO NAR31)

| NCoA→NAR31 | PCoA→CN | HOME ADDRESS OF MN10 (HOME ADDRESS OPTION) | ... |
|---|---|---|---|

(PACKET FROM NAR31 TO PAR21)

| NAR31→PAR21 | PCoA→CN | HOME ADDRESS OF MN10 (HOME ADDRESS OPTION) | ... |
|---|---|---|---|

(PACKET FROM PAR21 TO CN40)

| PCoA→CN | HOME ADDRESS OF MN10 (HOME ADDRESS OPTION) | ... |
|---|---|---| ic
COMMUNICATION SYSTEM, MOBILE TERMINAL AND ACCESS ROUTER

TECHNICAL FIELD

The present invention relates to an improvement of technique of fast handover (Fast Mobile IP; hereinafter referred as "FMIP") in a conventional type mobile IP (Mobile Internet Protocol; hereinafter referred as "MIP").

BACKGROUND ART

In the past, the technique of FMIP has been known as a technique to provide effective means for Internet application requiring real time to minimize packet loss, which cannot be prevented by ordinary layer-3 handover using MIP technique (e.g. see the Non-Patent Document as given below.) Description will be given below on FMIP by referring FIG. 1, FIG. 41 and FIG. 42.

The radio communication system shown in FIG. 1 includes: IP network (communication network) 15 such as Internet, a plurality of subnets (also called subnetworks) 20 and 30 connected to IP network, a mobile terminal (MN: Mobile Node) 10, which can be connected to one of the plurality of subnets 20 and 30, and CN (Correspondent Node), which is correspondent of MN10. In FIG. 1, two subnets 20 and 30 are shown as the plurality of subnets 20 and 30.

The subnet 20 comprises an access router (PAR) 21 for executing the routing to an IP packet (packet data), and a plurality of access points (APs) 22 and 23 for forming inherent radio coverage areas (communicatable areas) 22 and 23. Each of these APs 22 and 23 is connected to PAR21, and PAR21 is connected to the IP network 15. In FIG. 1, two APs 22 and 23 are shown as the plurality of APs 22 and 23. Also, the subnet 30 comprises the same aspect of connection as the subnet 20 as described above by an access router (NAR) 31 and a plurality of APs 32 and 33.

Here, assumption is made on a case where handover is executed from the subnet 20 to the subnet 30 when MN10 moves in a radio coverage area 34 formed by AP32 via an overlap area 26 from a radio coverage area 25 formed by AP23. Hereinafter, the access router, which is present at a superior position to AP23 and to which MN10 is connected before the handover, is called PAR (Previous Access Router) 21, and the access router, which is present at a superior position of AP32 and to which MN10 is connected after the handover, is called NAR (New Access Router) 31.

PAR21, i.e. a component element of the subnet 20, and NAR31, i.e. a component element of the subnet 30, can communicate with each other via the IP network 15. That is, the subnet 20 and the subnet 30 are connected via the IP network 15.

Next, description will be given on operation in FMIP referring to FIG. 1. In FMIP, there are two operation modes, depending on whether FBAck (Fast Binding Acknowledgement) message is received or not on a link (link before handover), to which MN10 is connected before the handover. This depends on whether MN10 transmits FBU (Fast Binding Update) message or not on a link before the handover. Hereinafter, an operation mode in case MN10 transmits FBU message on a link before the handover is called a first operation mode, and an operation mode in case MN10 does not transmit FBU message on a link before the handover is called a second operation mode.

First, description will be given below on the first operation mode, in which MN10 transmits FBU message on a link before the handover. FIG. 41 is a sequence chart to show general features of the first operation mode in FMIP when MN10 transmits FBU message on a link before the handover.

For instance, when MN10 starts to move from an area of PAR21 (radio coverage area 25 of AP23) to an area of NAR31 (radio coverage area 34 of AP32), the movement is detected by a layer 2, and the handover in the layer 3 as starting point is initiated. This initiation of the handover is determined through comparison of the intensity of the received electric field from AP23 with that of the electric field from AP32 in the overlap area 26.

When information including AP-ID (identification information of each AP) of AP32, which is the destination of movement, is notified from the layer 2, MN10 transmits an RtSolPr (Router Solicitation for Proxy) message including AP-ID of AP32 to PAR21 currently connected (Step S801). Upon receipt of the RtSolPr message, PAR21 retrieves an access router existing in the neighborhood according to AP-ID of AP32 as notified from MN10 and acquires the information of NAR31, or it acquires the information of NAR31 from the information already retrieved (information retained by PAR21).

Then, PAR21 transmits a PrRtAdv (Proxy Router Advertisement) message including the information of NAR31 (e.g. link layer address of NAR31, or network prefix of the subnet 30, to which NAR31 belongs) to MN10 as a response to the RtSolPr message (Step S803).

Upon receipt of this PrRtAdv message, MN10 generates NCoA (New Care-of Address), which is an address adaptable at the subnet 30 by using the network prefix of the subnet 30 included in the PrRtAdv message and the link layer address of MN10 itself, and FBU message including NCoA is transmitted to PAR21 (Step S805).

Upon receipt of the FBU message, PAR21 transmits an HI (Handover Initiate) message including NCoA to NAR31 in order to confirm whether the NCoA generated at MN10 is an address usable at the subnet 30 or not (Step S807). When the HI message is received, NAR31 verifies whether the NCoA included in the HI message is effective or not. In case NCoA is effective, HAck (Handover Acknowledge) message to specify the status showing the result is transmitted to PAR21 (Step S809). When the HAck message is received, PAR21 transmits FBAck message to notify the result to MN10 and NAR31 (Steps S811 and S813). Then, the packet sent to MN10 is forwarded to NAR31 (Step S815). When the packet to MN10 has been forwarded from PAR21, NAR31 performs buffering of the packet.

Then, MN10 initiates actual moving to the subnet 30 and executes the handover from AP23 to AP32, for instance (Step S817). Immediately after connection switchover to NAR31, an FNA (Fast Neighbor Advertisement) message to request the notification of connection to NAR31 and the transmission of the packet processed by buffering is transmitted to NAR31 (Step S819). Upon receipt of FNA message, NAR31 transmits the packet processed by buffering to MN10 (Step S821).

Next, description will be given on the second operation mode, in which MN10 does not transmit the FBU message on a link before the handover and transmits FNA (message including FBU) on a link after the handover. FIG. 42 is a sequence chart to show general features of the second operation mode in FMIP when MN10 in the conventional technique transmits FNA [FBU] message on a link after the handover in the conventional technique (prior art).

Similarly to the first operation mode shown in FIG. 41, MN10 transmits RtSolPr message (Step S901) and receives PrRtAdv message (Step S903). Then, without transmitting the FBU message in the first operation mode shown in FIG. 41

(Step S805 in FIG. 41), actual moving to the subnet 30 is initiated. For instance, L2 handover is executed from AP23 to AP32 (Step S905).

Then, immediately after the connection switchover to NAR31, MN10 transmits the FNA message including FBU message in it (this message is described as FNA [FBU]) to NAR31 (Step S907). NAR31 verifies the effectiveness of NCoA included in the FNA message (Step S909). In case NCoA is effective, the FBU message is transmitted to PAR21 (Step S911). In case NCoA is not effective, NAAck (Neighbor Advertisement Acknowledgement) message to notify that NCoA cannot be used is sent to MN10.

As a response to this FBU message, PAR21 transmits FBAck message to NAR31 (Step S913) and forwards the packet addressed to MN10 to NAR31 (Step S915). NAR31 receives FBAck message from PAR21 and forwards the packet addressed to MN10 as received from PAR21 to MN10 (Step S917).

In the Non-Patent Document 1 as given below, it is suggested that IPv6 address of NAR31 is set as the destination address of the FNA message when the FNA message is sent to NAR31. In view of the fact that the setting of NCoA is given as the address of transmission source of the FNA message, there is no disclosure on the procedure, by which it can be estimated that IPv6 address of NAR31 is a global IP address (there is no disclosure on the procedure, by which NAR31 acquires global IPv6 address) or it is a multi-cast address in the subnet 30.

[Non-Patent Document 1] Rajeev Koodli; "Fast Handovers for Mobile IPv6", draft-ietf-mobileip-fast-mipv6-08, October 2003.

[Non-Patent Document 2] T. Narten, E. Nordmark and W. Simpson: "Neighbor Discovery for IP Version 6 (IPv6)", RFC2461, December 1998.

However, according to the technique disclosed in the Non-Patent Document 1, MN10 can quickly receive the packet immediately after the handover by performing the acquisition and the registration (Binding Update) of NCoA before or immediately after the handover, while due consideration is not given to the quick transmission of the packet by MN10 after the handover.

FIG. 43 shows a routing table to explain a first example of the problem in the conventional FMIP technique. To transmit the packet to outside from inside of the subnets 20 and 30, MN10 refers to the routing table. FIG. 43 shows the routing table before MN10 carried out the handover. When the packet is transmitted to outside (e.g. CN40) under the condition that MN10 before the handover is connected with the subnet 30, the entry relating to a default router (a router set in such manner that the packet can be sent to outside from within the subnet 20) is hit from the transmission destination of the packet, and then, the entry where the link local address of PAR21 specified to the gateway of the entry is set to the destination is hit. As a result, MAC address of PAR21 specified to the gateway of the entry is set as the destination address of Ethernet (registered trademark) of the packet. FIG. 43 shows the routing table where the default router of the subnet 20 is the same as PAR21.

On the other hand, in order that MN10 transmits the packet from within the subnet 30 after the handover, the link local address of NAR31 or the link local address of the default router 37 of the subnet 30 must be set up as a default router in the routing table of MN10. However, despite of the fact that MN10 can acquire new CoA (NCoA) by FMIP before the handover, the default router in the subnet 20 before the handover is still set up as the default router of MN10 after the handover in the routing table. In this respect, the packet to be sent to outside from the subnet 30 is abandoned without being sent from the subnet 30. Even when MN10 attempts to update the routing table immediately after the handover, it is not possible to update the routing table because NAR31 of the subnet 30, which is a new destination of connection or the link local address of the default router 37 is not known.

On the other hand, in the Non-Patent Document 2 as given above, it is disclosed that MN10 can acquire the external transmission address as described in the RA message (the link local address of NAR31 as given above or the link local address of the default router 37 of the subnet 30) by receiving an RA (Router Advertisement) message from NAR31 or the default router 37. Also, in the RA message, information to identify the default router 37 is also described. However, the RA message is the message to be sent out periodically from each router, and it is substantially difficult that MN10 transmits the packet to outside (e.g. CN40) until MN10 passively receives RA message and acquires the external transmission address. Similarly, besides the external transmission address as given above, there is no procedure to acquire the information included in the RA message, which can be received at the subnet 30 except that the RA message is passively received while being in standby after the handover.

In case MN10 may have the global IPv6 address of NAR31 of the subnet 30 before the handover, the packet transmitted from MN10 immediately after the handover can reach CN40 if encapsulation of the packet as shown in FIG. 44 is carried out by MN10. However, various prescriptions must be newly set up such as conversion of header at NAR31 or de-encapsulation of the packet at PAR21, and this requires modification of the total communication system, and it is not a very realistic solution.

In FMIP, it is possible to acquire network prefix of the subnet 30 and the link layer address of NAR31, and it is possible to estimate the link local address of NAR31 from such types of information. However, even when the link local address of NAR31 can be estimated, it is necessary to confirm whether it is used (or it is correct) or not, and this means that time is required for confirmation. Also, it is possible to estimate the link local address of NAR31 but it is entirely impossible to estimate the link local address of the default router 37 existing in the subnet 30.

DISCLOSURE OF THE INVENTION

To solve the above problems, it is an object of the present invention to provide a communication system, a mobile terminal, and an access router, in which the mobile terminal carrying out the handover between subnets can quickly execute packet transmission to outside immediately after the handover.

To attain the above object, the communication system according to the present invention comprises a first access router belonging to a first subnet, and a second access router belonging to a second subnet different from said first subnet, said first access router and said second access router being connected via IP network, and a mobile terminal is connected to said first subnet or said second subnet via radio communication, wherein:

the mobile terminal connected to said first subnet requests a link local address of said second access router in said second subnet to said second access router immediately after executing handover to said second subnet and acquires said link local address of said second access router from said second access router.

With the arrangement as described above, the mobile terminal can acquire a link local address of the access router of a subnet, which is the destination of the handover immediately after it executes the handover.

Also, to attain the above object, the communication system of the present invention comprises a communication system, comprising a first access router belonging to a first subnet, and a second access router belonging to a second subnet different from said first subnet, said first access router and said second access router being connected via IP network, and a mobile terminal is connected to said first subnet or said second subnet via radio communication, wherein:

the mobile terminal connected to said first subnet requests a link local address of a default router in said second subnet to said second access router immediately after executing handover to said second subnet and acquires said link local address of said default router from said second access router.

With the arrangement as described above, the mobile terminal can acquire a link local address of the access router of a subnet, which is the destination of the handover immediately after it executes the handover.

Further, the present invention provides the communication system as described above, wherein said mobile terminal is so arranged that it refers to said link local address when transmitting packet to outside of said second subnet after acquiring said link local address from said second access router.

With the arrangement as described above, the mobile terminal can quickly perform packet transmission to outside after the handover by using the acquired link local address after executing the handover between subnets.

Also, the present invention provides the communication system as described, wherein said mobile terminal is so arranged that it requests said link local address to said second access router when transmitting a message V to notify connection to said second subnet.

With the arrangement as described above, the mobile terminal can request the link local address when transmitting a message V to the access router of the subnet connected immediately after the handover.

Further, the present invention provides the communication system as described above, wherein said mobile terminal is so arranged that information to request said link local address is added within said message V, and said second access router is so arranged that an RA message including said link local address is transmitted to said mobile terminal.

With the arrangement as described above, the mobile terminal can transmit the message V including the request of the link local address to the access router of the subnet connected immediately after the handover and can acquire the link local address relating to the subnet after the handover by receiving the RA message including the link local address from the access router of the subnet connected immediately after the handover.

Also, the present invention provides the communication system as described above, wherein said mobile terminal is so arranged that information to request said link local address different from said message V is transmitted to said second access router, and said second access router is so arranged that an RA message including said link local address is transmitted to said mobile terminal.

With the arrangement as described above, the mobile terminal can transmit information to request a link local address different from the message V to the access router of the subnet connected immediately after the handover and can acquire the link local address relating to the subnet after the handover by receiving an RA message including the link local address from the access router of the subnet connected immediately after the handover.

Further, the present invention provides the communication system as described above, wherein said second access router is so arranged that an RA message including said link local address is transmitted to said mobile terminal when a message V to notify the connection to said second subnet is received from said mobile terminal.

With the arrangement as described above, the mobile terminal can transmit the message V to the access router of the subnet connected immediately after the handover and can acquire the link local address relating to the subnet after the handover by receiving an RA message including the link local address from the access router of the subnet connected immediately after the handover.

Also, the present invention provides the communication system, which comprises a first access router belonging to a first subnet, and a second access router belonging to a second subnet different from said first subnet, said first access router and said second access router being connected via IP network, and a mobile terminal is connected to said first subnet or said second subnet via radio communication, wherein:

The mobile terminal connected to said first subnet requests a link local address to an arbitrary router belonging to said second subnet immediately after executing handover to said second subnet and acquires said link local address from said arbitrary router and identifies a default router in said second subnet.

With the arrangement as described above, the mobile terminal can acquire the link local address of the default router of the subnet at the handover destination immediately after executing the handover.

Further, the present invention provides the communication system as described above, wherein said mobile terminal is so arranged that it refers to a link local address of a default router when packet is transmitted to outside of said second subnet after said default router has been identified.

With the arrangement as described above, the mobile terminal executing the handover between subnets can quickly perform packet transmission to outside after the handover.

Also, the present invention provides the communication system as described above, wherein said mobile terminal is so arranged that it requests said link local address to said arbitrary router when transmitting a message V to notify connection to said second subnet.

With the arrangement as described above, the mobile terminal can request the link local address when transmitting the message V to notify connection to the subnet to an arbitrary router of the subnet connected after the handover.

Further, the present invention provides the communication system as described above, wherein said mobile terminal multi-casts at least one of said message V or said message V added with information to instruct a request of said link local address or information to request said link local address different from said message V in said second subnet, and said default router in said second subnet transmits an RA message to said mobile terminal when receiving the information transmitted by said multi-casting.

With the arrangement as described above, the mobile terminal can receive an RA message including the link local address from the default router by transmitting the message V including the request of the link local address or information to request a link local address different from the message V or the message V itself to an arbitrary router of the subnet connected after the handover.

According to the present invention, a mobile terminal and an access router included in the communication system as described above can be provided.

As the message V as described above,—in FMIP, for instance—MN can use the FNA message, which notifies the connection to the subnet belonging to NAR, to NAR.

The communication system, the mobile terminal, and the access router of the present invention have the arrangement as described above, and such effects can be provided that the mobile terminal executing the handover between subnets can quickly transmit packet to outside immediately after the handover

BRIEF DESCRIPTION OF THE DRAWINGS

FIG. 11 is a block diagram to show an example of arrangement of MN in the fourth embodiment of the present invention;

FIG. 12 is a sequence chart to show principal processing common to fifth to eighth embodiments of the present invention;

FIG. 21 is a sequence chart to show principal processing common to ninth to twelfth embodiments of the present invention;

FIG. 22 is a block diagram to show an example of arrangement of PAR in the ninth embodiment of the present invention;

FIG. 43 is a table to explain a first example of the problems in conventional FMIP technique; and FIG. 44 represents diagrams to explain a second example of the problem in the conventional FMIP technique.

BEST MODE FOR CARRYING OUT THE INVENTION

Figure 1:
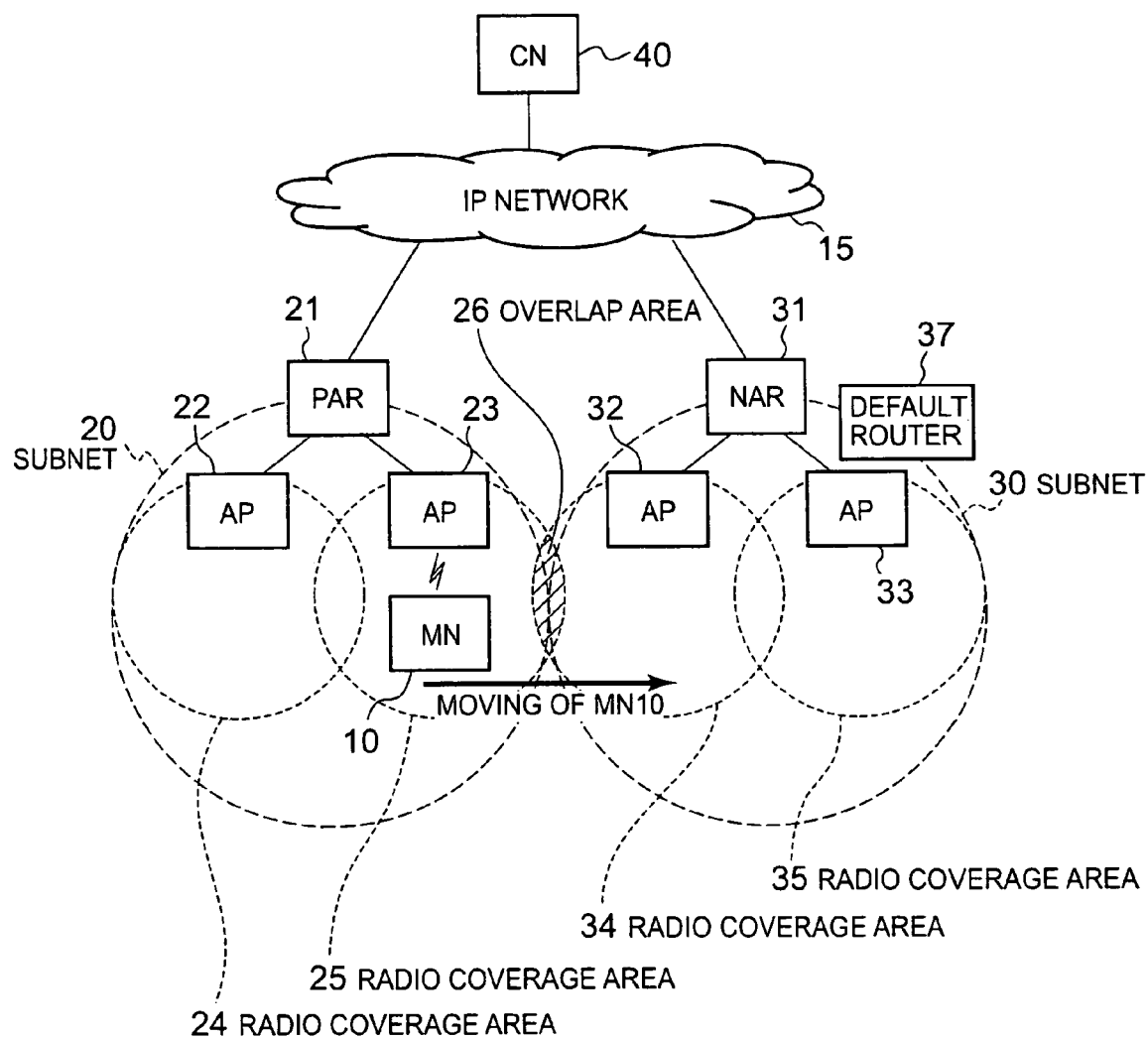
FIG. 1 is a schematical drawing to show an arrangement of a radio communication system commonly used in the present invention and in the conventional technique (prior art)

Description will be given below on the first to the fifteenth embodiments of the present invention referring to the drawings. The arrangement of a radio communication system as shown in FIG. 1 used in the explanation of the prior art is also referred in the explanation in the first to the fifteenth embodiments of the present invention. Specifically, assumption is made on a case where the handover from a subnet 20 to a subnet 30 is carried out when MN10, in communication with CN40, moves from a radio coverage area 25 formed by AP23 to a radio coverage area 34 by AP32 via an overlap area 26.

In the first to the twelfth embodiments as given below, description will be given on a procedure, by which MN10 acquires an external transmission address (a link local address of NAR31 or a link local address of a default router 37 belonging to the subnet 30) relating to the subnet 30 connected after the handover on a link of the subnet 20 connected before the handover. In the thirteenth to the fifteenth embodiments as given below, description will be given on a procedure, by which MN10 quickly acquires the external transmission address relating to the subnet 30 after the handover on a link of the subnet 30 connected after the handover.

1st Embodiment

Figure 2:
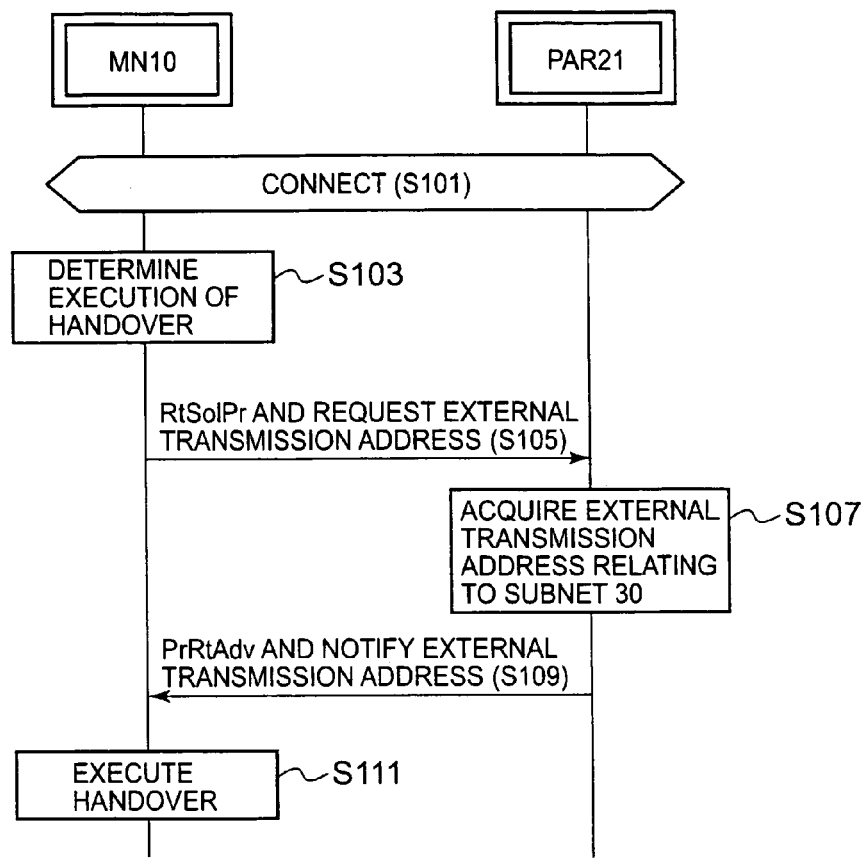
FIG. 2 is a sequence chart showing principal processing common to a first embodiment to a fourth embodiment of the present invention.

First, description will be given on the first embodiment of the present invention. FIG. 2 is a sequence chart to show principal processing common to the first to the fourth embodiments of the present invention. The sequence chart given in FIG. 2 shows only the principal processing according to the present invention, and the technique explained in the first to the fourth embodiments of the present invention can be carried out in combination with a first or a second operation mode in FMIP shown in FIG. 41 and FIG. 42.

Figure 41:
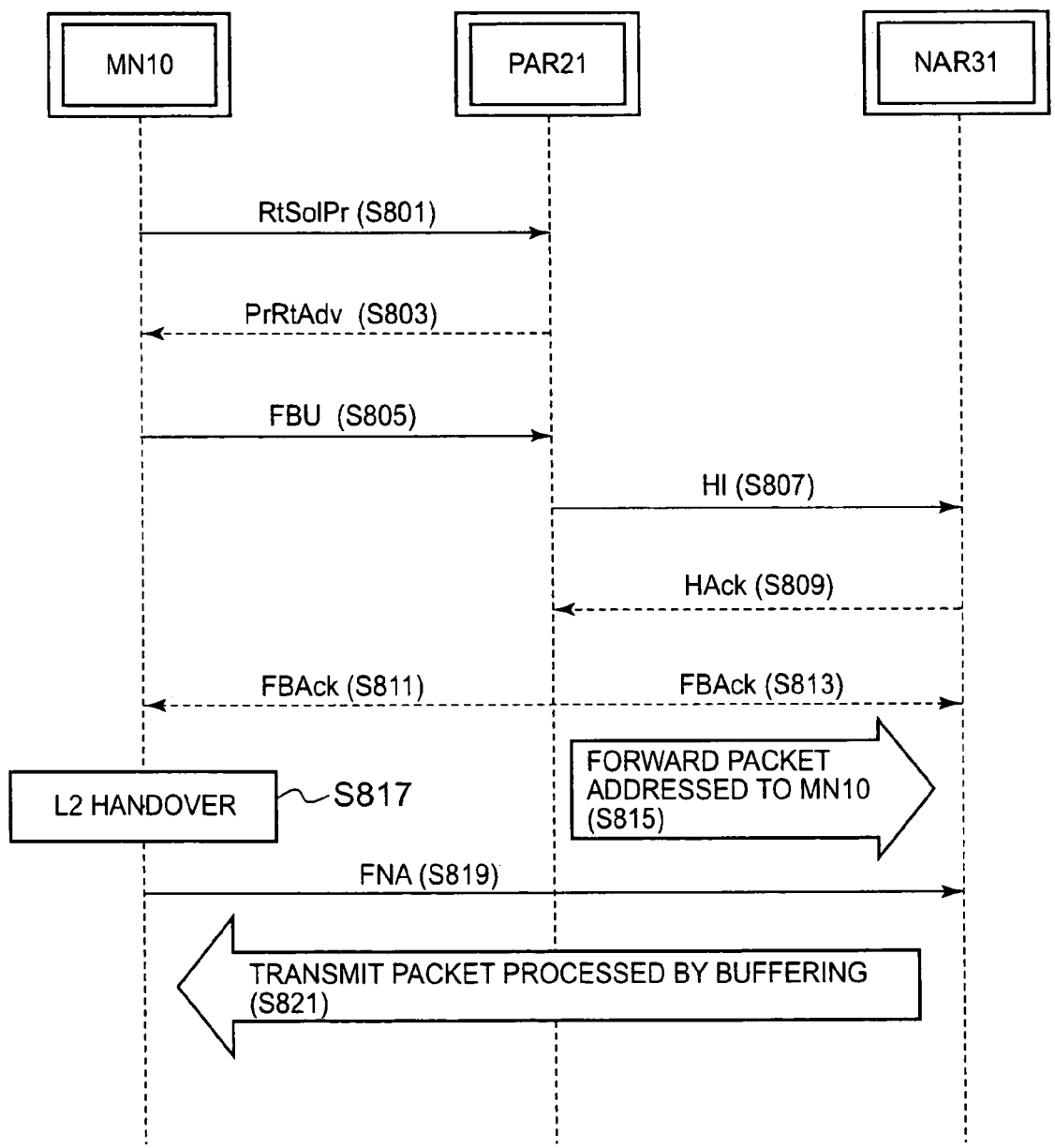
FIG. 41 is a sequence chart to show general features of a first operation mode in FMIP in case MN10 in the conventional technique transmits an FBU message by a link before the handover.
Figure 42:
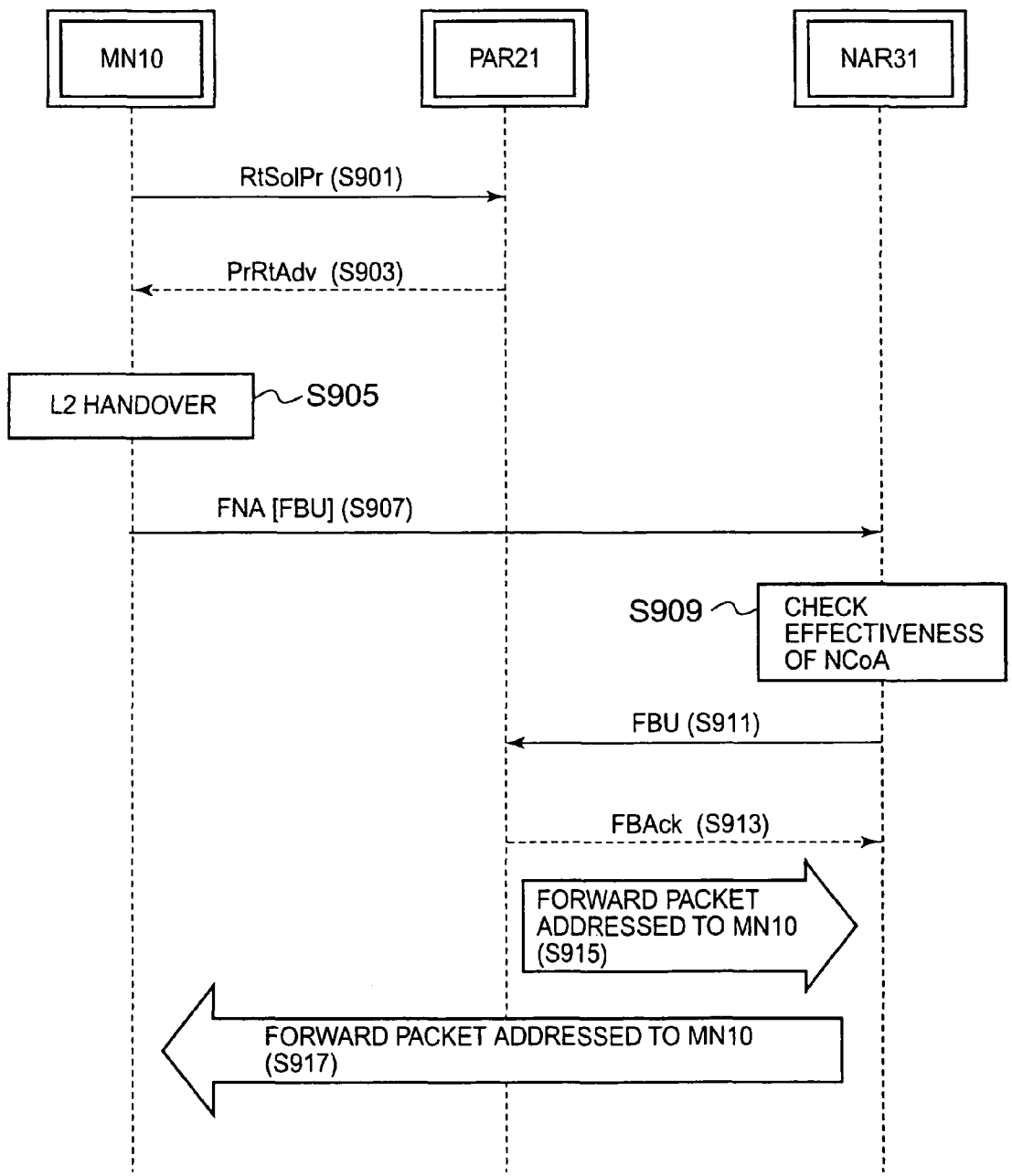
FIG. 42 is a sequence chart to show general features of a second operation mode in FMIP in case MN10 in the conventional technique (prior art) transmits an FNA [FBU] message in a link after the handover.

In the sequence chart shown in FIG. 2, similarly to the conventional FMIP shown in FIG. 41 and FIG. 42, MN10 is first connected to the subnet 20 (Step S101), and under this connected condition, AP32 within the range of a new subnet 30 is discovered, and the execution of L2 handover to AP32 is decided (S103). Then, MN10 transmits information that the external transmission address is requested in addition to RtSolPr message including AP-ID of AP32 (Step S105).

PAR21 receives RtSolPr message from MN10, and, by using the procedure as a procedure to acquire information of NAR31 as executed in the conventional FMIP technique, for instance, it acquires the external transmission address relating to the subnet 30 (Step S107). More concretely, PAR21 retrieves an access router present in the neighborhood according to AP-ID of AP32 included in the RtSolPr message and acquires a link local address of NAR31 belonging to the subnet 30 or a default router 37. Or, PAR21 can acquire a link local address of NAR31 belonging to the subnet 30 or the default router 37 from information already retrieved (the information retained by PAR21).

Then, PAR21 notifies the external transmission address relating to the subnet 30 acquired in Step S107 to MN10 at the time of transmission of PrRtAdv message including information of NAR31 (Step S109). In so doing, MN10 can acquire the external transmission address relating to the subnet 30 from PAR21. Specifically, MN10 can quickly execute packet transmission to outside (e.g. CN40) in the subnet 30 by setting up a link local address of NAR31 as acquired in advance by the above procedure or a link local address of the default router 37 immediately after the handover to the link of the subnet 30 (Step S111) as a default router in a routing table.

Figure 3:
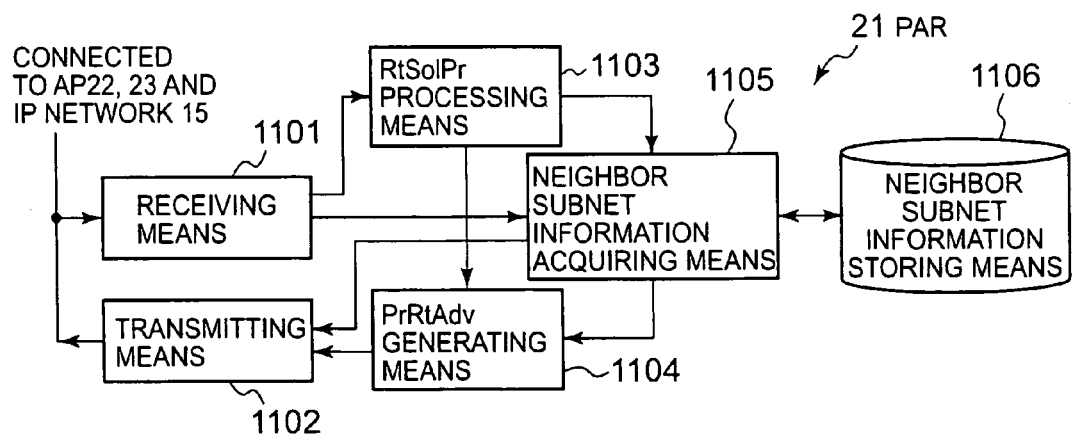
FIG. 3 is a block diagram to show an example of arrangement of PAR in the first embodiment of the present invention.

FIG. 3 is a block diagram to show an example of arrangement of PAR in the first embodiment of the present invention. In FIG. 3, functions of PAR21 are shown by blocks, while these functions can be fulfilled by hardware and/or software. PAR21 shown in FIG. 3 comprises receiving means 1101, transmitting means 1102, RtSolPr processing means 1103, PrRtAdv generating means 1104, neighbor subnet information acquiring means 1105, and neighbor subnet information storing means 1106.

The receiving means 1101 and the transmitting means 1102 are the means for transmitting and receiving packet by connecting with AP (AP22 and AP23) present under the control or connecting with IP network 15. Normally, these are different from an interface to be connected to AP22 and AP23 or an interface to be connected with IP network 15, and a plurality of receiving means and transmitting means are provided. However, these are shown here as a single receiving means 1101 and a single transmitting means 1102.

Also, the RtSolPr processing means 1003 carries out processing relating to RtSolPr message received from MN10 and instructs the PrRtAdv generating means 1104 to generate PrRtAdv message, which is to be a response message, and it also instructs the neighbor subnet information acquiring means 1105 to acquire the external transmission address relating to the subnet 30 of handover destination of MN10.

When receiving an instruction from the RtSolPr processing means 1103, PrRtAdv generating means 1104 generates a PrRtAdv message including the external transmission address relating to the subnet 30 notified by the neighbor subnet information acquiring means 1105.

The neighbor subnet information acquiring means 1105 is the means to acquire the external transmission address relating to the subnet 30 and to notify the external transmission address relating to the subnet 30 as acquired to the PrRtAdv generating means 1104. For instance, the neighbor subnet information acquiring means 1105 transmits information to request the external transmission address relating to the subnet 30 to NAR31 or to the server as necessary via the transmitting means 1102 and receives the external transmission address relating to the subnet 30 via the receiving means 1101 and can acquire the external transmission address relating to the subnet 30. Also, it is possible to store the external transmission address relating to the subnet 30 as acquired in the neighbor subnet information storing means 1106. It is also possible to acquire the external transmission address relating to the subnet 30 as desired by referring to the external transmission address relating to the subnet 30 stored in the neighbor subnet information storing means 1106.

Figure 4A:
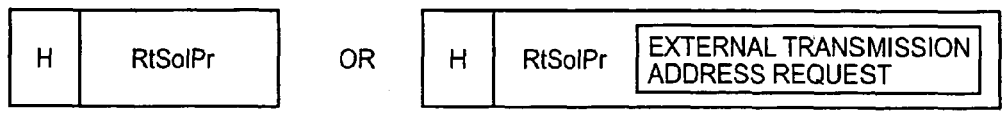
FIG. 4A represents diagrams showing information to request external transmission address from MN to be processed in PAR as shown in FIG. 3.
Figure 4B:
FIG. 4B is a diagram to show an example of data arrangement of information to notify the external transmission address transmitted to MN and processed in PAR shown in FIG. 3.

FIG. 4A represents diagrams to show the request information of the external transmission address from MN to be processed in PAR shown in FIG. 3, and FIG. 4B is a diagram to show an example of data arrangement of the notifying information of the external transmission address to be transmitted to MN and processed in PAR shown in FIG. 3. As shown in FIG. 4A, from MN10, PAR21 receives a conventional RtSolPr message or an RtSolPr message added with information to instruct the request of the external transmission address.

For example, PAR21 is so arranged that it transmits the PrRtAdv message including the external transmission address shown in FIG. 4B in case a conventional RtSolPr message has been received (i.e. the conventional RtSolPr message plays a role of information to request the external transmission address). Or, PAR21 is so arranged that it verifies whether the information to instruct the request of the external transmission address is present or not within the RtSolPr message and transmits the PrRtAdv message including the external transmission address shown in FIG. 4B in case the information to instruct the request of the external transmission address is added.

Therefore, although not shown in the figures, for the purpose of achieving the first embodiment of the present invention, MN10 must have the means to extract the external transmission address from within the PrRtAdv message received from PAR21. In case PAR21 is so arranged that it transmits the PrRtAdv message including the external transmission address to MN10, which transmits the RtSolPr message added with the information to instruct the request of the external transmission address, MN10 must have the means to insert the information to instruct the request of the external transmission address within the RtSolPr message.

As described in the above, according to the first embodiment of the present invention, when MN10 executes the handover to different subnets 30, MN10 requests the external transmission address relating to the subnet 30 by transmitting RtSolPr message to PAR21 connected before the handover, and PAR21 can notify the external transmission address relating to the subnet 30 by transmitting the PrRtAdv message, which is a response message. Thus, MN10 can acquire the external transmission address relating to the subnet 30 connected after the handover on a link of the subnet 20 connected before the handover and can quickly transmit packet to outside immediately after the handover.

In the first embodiment as described above, explanation has been given on a case where it is so arranged that the external transmission address is included in the PrRtAdv message, which is a response message to RtSolPr message received from MN10, and PAR21 transmits the PrRtAdv message including the external transmission address. However, PAR21 can also transmit the PrRtAdv message (unsolicited PrRtAdv message) without receiving the RtSolPr message from MN10 (See Section 3.3 of the Non-Patent Document 1).

In the unsolicited PrRtAdv message transmitted under the condition where there is no request by the RtSolPr message, information relating to a specific subnet among the subnets in the neighborhood (e.g. information such as IP address of NAR31 belonging to the subnet or a network prefix of the subnet) is included. Upon receipt of the unsolicited PrRtAdv message, MN10 must execute the handover to the specific subnet included in the unsolicited PrRtAdv message. That is, the unsolicited PrRtAdv message is a message, which includes the information relating to a specific subnet and to instruct the specific subnet to carry out the handover.

As shown in FIG. 4B, according to the present invention, it can also be so arranged that the external transmission address relating to a specific subnet is included in the unsolicited PrRtAdv message as described above together with the information relating to the specific subnet, and that PAR 21 can transmit the unsolicited PrRtAdv message including the external transmission address to MN10 under the condition that there is no request from MN10.

2nd Embodiment

Next, description will be given on the second embodiment of the present invention. The operation in the second embodiment of the invention is the same as the operation described in the above in connection with the sequence chart of FIG. 2, and detailed description is not given here.

Figure 5:
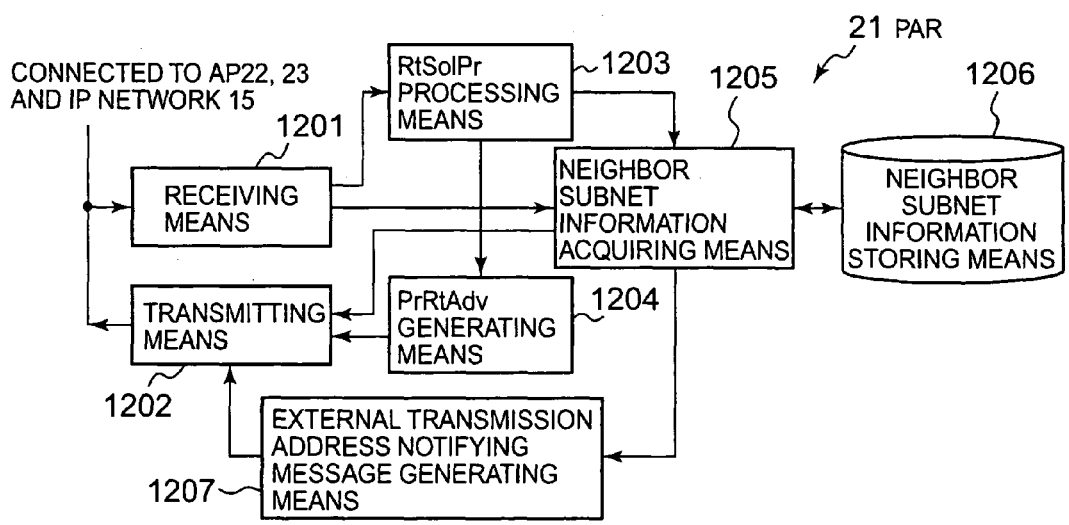
FIG. 5 is a block diagram to show an example of arrangement of PAR in the second embodiment of the invention.

FIG. 5 is a block diagram to show an example of arrangement of PAR in the second embodiment of the present invention. Although the functions of PAR 21 are shown by blocks in FIG. 5, these functions can be fulfilled by hardware and/or software. PAR21 shown in FIG. 5 comprises receiving means 1201, transmitting means 1202, RtSolPr processing means 1203, PrRtAdv generating means 1204, neighbor subnet information acquiring means 1205, neighbor subnet information storing means 1206, and external transmission address notifying message generating means 1207. The receiving means 1201, the transmitting means 1202, the RtSolPr processing means 1203, and the neighbor subnet information storing means 1206 are the same as the receiving means 1101, the transmitting means 1102, the RtSolPr processing means 1103, and the neighbor subnet information storing means 1106 as shown in FIG. 3 respectively.

The PrRtAdv generating means 1204 is the means to generate the same message as the PrRtAdv message generated in the conventional FMIP upon receipt of an instruction from the RtSolPr processing means 1203. That is, it is the same as the means to generate the PrRtAdv message in the conventional FMIP.

The neighbor subnet information acquiring means 1205 is the means to acquire the external transmission address relating to the subnet 30 and to notify the external transmission address relating to the subnet 30 as acquired to the external transmission address notifying message generating means 1207. It is different from the neighbor subnet information acquiring means 1105 as shown in FIG. 3 in that the notifying destination of the external transmission address relating to the subnet 30 is the external transmission address notifying message generating means 1207, and the other functions are the same as those of the neighbor subnet information acquiring means 1105 as shown in FIG. 3.

The external transmission address notifying message generating means 1207 is the means to generate an external transmission address notifying message including the external transmission address relating to the subnet 30 notified from the neighbor subnet information acquiring means 1205. The external transmission address notifying message is different from the PrRtAdv message.

Figure 6A:
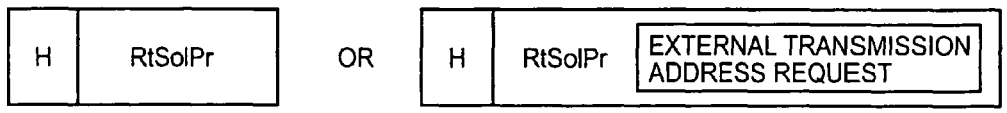
FIG. 6A represents diagrams to show information to request the external transmission address from MN to be processed in PAR shown in FIG. 5.
Figure 6B:
FIG. 6B represents diagrams to show an example of data arrangement of information to notify the external transmission address transmitted to MN and processed in PAR shown in FIG. 5.

FIG. 6A represents diagrams to show the information to request the external transmission address from MN to be processed in PAR shown in FIG. 5. FIG. 6B represents diagrams to show an example of data arrangement of the information to notify the external transmission address transmitted to MN and processed in PAR shown in FIG. 5. The RtSolPr message shown in FIG. 6A is the same as the message shown in FIG. 4A.

It is so arranged that, besides the PrRtAdv message, PAR21 transmits the external transmission address notifying message to MN10 when the conventional RtSolPr message shown in FIG. 6A or the RtSolPr message including the request of the external transmission address has been received. The external transmission address notifying message must be transmitted to MN10 before MN10 executes L2 handover. The external transmission address notifying message and the PrRtAdv message are transferred by packets independent from each other, and the external transmission address notifying message can be transmitted at any timing as desired without depending on the timing to transmit the PrRtAdv message. It is also possible to synchronize the transmission of the external transmission address notifying message with the transmission of the PrRtAdv message and to arrange that both messages, i.e. the external transmission address notifying message and the PrRtAdv message, can be continuously transmitted from PAR21 to MN10, for instance.

Although not shown in the figures, for the purpose of achieving the second embodiment of the present invention, MN21 must have the means to extract the external transmission address from the external transmission address notifying message received from PAR21 (e.g. the external transmission address notifying message processing means 1417 shown in FIG. 11 as to be given later). In case it is so arranged that PAR21 transmits the PrRtAdv message including the external transmission address to MN10, which has sent the RtSolPr message added with the information to instruct the request of the external transmission address, MN10 must have the means to insert the information to instruct the request of the external transmission address in the RtSolPr message although not shown in the figures.

As described above, according to the second embodiment of the present invention, when MN10 carries out the handover to different subnets 30, MN10 can request the external transmission address relating to the subnet 30 by transmitting the RtSolPr message to PAR21 connected before the handover. PAR21 can notify the external transmission address relating to the subnet 30 by transmitting the external transmission address notifying message different from the PrRtAdv message, which is a response message. MN10 can acquire the external transmission address relating to the subnet connected after the handover on a link of the subnet 20 connected before the handover and can quickly transmit packet to outside immediately after the handover.

3rd Embodiment

Next, description will be given on the third embodiment of the present invention. The operation in the third embodiment of the invention is the same as the operation explained in the above by referring to the sequence chart of FIG. 2, and detailed description is not given here.

Figure 7:
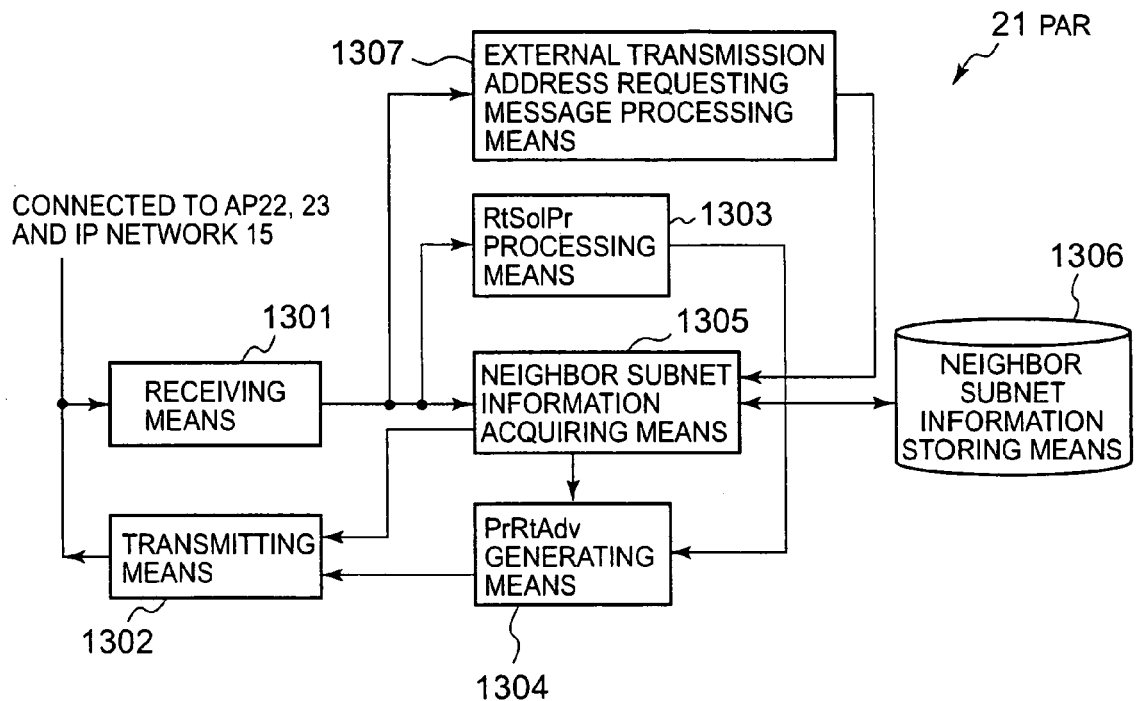
FIG. 7 is a block diagram to show an example of arrangement of PAR in a third embodiment of the present invention.

FIG. 7 is a block diagram to show an example of arrangement of PAR in the third embodiment of the present invention. Although the functions of PAR21 are shown by blocks in FIG. 7, these functions can be fulfilled by hardware and/or software. PAR21 shown in FIG. 7 comprises receiving means 1301, transmitting means 1302, RtSolPr processing means 1303, PrRtAdv generating means 1304, neighbor subnet information acquiring means 1305, neighbor subnet information storing means 1306, and external transmission address requesting message processing means 1307. The receiving means 1301, the transmitting means 1302, the PrRtAdv generating means 1304, and the neighbor subnet information storing means 1306 are the same as the receiving means 1101, the transmitting means 1102, the PrRtAdv generating means 1104, and the neighbor subnet information storing means 1106 as shown in FIG. 3 respectively.

The RtSolPr processing means 1303 is the means to carry out processing relating to the RtSolPr message received from MN10 and to instruct generation of the PrRtAdv message, which is to be a response message, to the PrRtAdv generating means 1304. That is, it is the same as the means to perform processing of the RtSolPr message in the conventional FMIP.

The neighbor subnet information acquiring means 1305 is the means to receive and instruct to acquire the external transmission address relating to the subnet 30 from the external transmission address requesting message processing means 1307 and to acquire the external transmission address relating to the subnet 30 and to notify the external transmission address relating to the subnet 30 as acquired to the PrRtAdv generating means 1304. It is different from the neighbor subnet information acquiring means 1105 shown in FIG. 3 in that the instruction to acquire the external transmission address relating to the subnet 30 is given from the external transmission address requesting message processing means 1307, and the other functions are the same as those of the neighbor subnet information acquiring means 1105 as shown in FIG. 3.

The external transmission address requesting message processing means 1307 is the means to perform processing relating to the external transmission address requesting message transmitted at the same timing as the RtSolPr message by MN10 and to instruct the acquisition of the external transmission address relating to the subnet specified by this message to the neighbor subnet information acquiring means 1305. It is desirable that an arbitrary information able to specify the subnet 30 such as AP-ID of AP32 or component element of the subnet is included in the external transmission address requesting message.

Figure 8A:
FIG. 8A represents diagrams to show information to request the external transmission address from MN as to be processed in PAR shown in FIG. 7.
Figure 8B:
FIG. 8B represents a diagram to show an example of data arrangement of information to notify the external transmission address transmitted to MN and processed in PAR shown in FIG. 7.

FIG. 8A represents diagrams to show the request information of the external transmission address from MN as to be processed in PAR shown in FIG. 7. FIG. 8B is a diagram to show an example of data arrangement of the notifying information of the external transmission address to be transmitted to MIN and processed in PAR shown in FIG. 7. The PrRtAdv message shown in FIG. 8B is the same as the one shown in FIG. 4B.

PAR21 is so arranged that it transmits the PrRtAdv message including the external transmission address indicated in FIG. 8B when the external transmission address requesting message transmitted at the same timing as the RtSolPr message by MN10 is received (i.e. PAR21 receives both the RtSolPr message and the external transmission address requesting message). Here, description has been given on the case where the external transmission address requesting message is transmitted at the same timing as the RtSolPr message, while it can also be so arranged that PAR21 receives the external transmission address requesting message earlier than the RtSolPr message and prepares for the notification of the external transmission address relating to the subnet 30 in advance to MN10 and the PrRtAdv message including the external transmission address can be quickly generated in case the RtSolPr message is received thereafter.

Although not shown in the figures, for the purpose of achieving the third embodiment of the present invention, MN10 must have the means to generate the external transmission address requesting message at the same time as the generation of the RtSolPr message after deciding the execution of the handover (e.g. the external transmission address requesting message generating means 1416 shown in FIG. 11 as to be given later) and also must have the means to extract the external transmission address from the PrRtAdv message received from PAR21.

As described above, according to the third embodiment of the present invention, MN10 can request the external transmission address relating to the subnet 30 by transmitting the external transmission address requesting message to PAR21 connected before the handover and PAR21 can notify the external transmission address relating to the subnet 30 as acquired according to the external transmission address requesting message by transmitting the PrRtAdv message. MN10 can acquire the external transmission address relating to the subnet connected after the handover on a link of the subnet 20 connected before the handover and can quickly transmit packet to outside immediately after the handover.

4th Embodiment

Next, description will be given on the fourth embodiment of the present invention. The operation in the fourth embodiment of the invention is the same as the operation explained above in connection with the sequence chart of FIG. 2, and detailed description is not given here.

Figure 9:
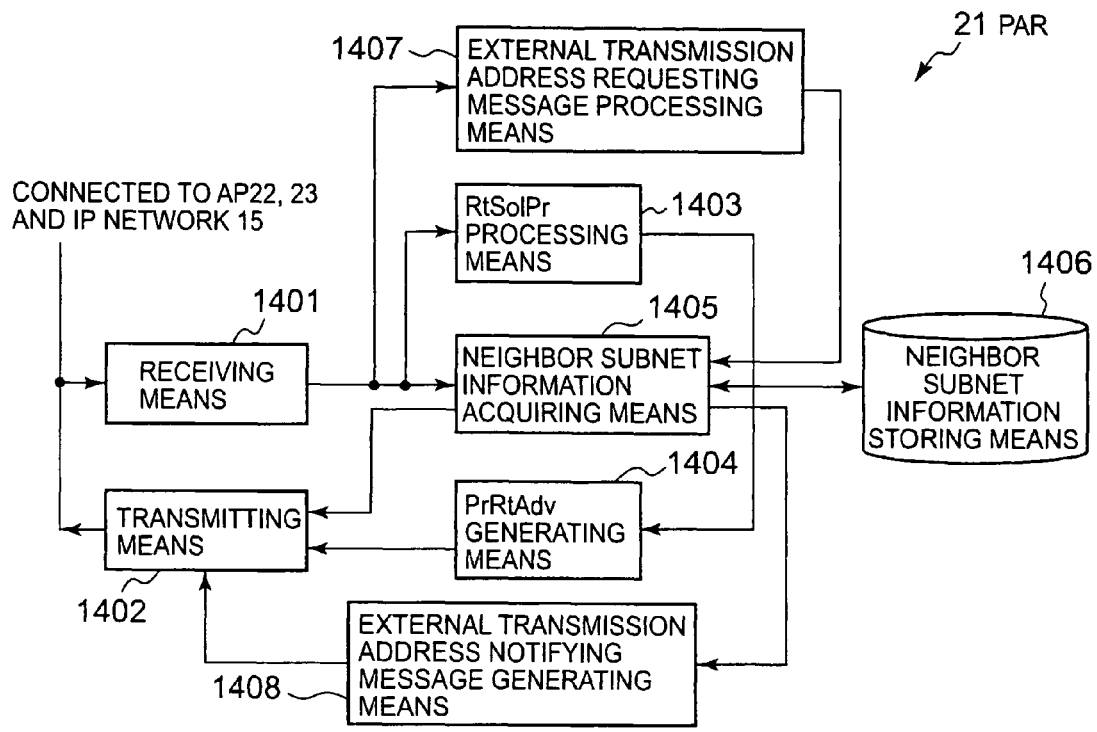
FIG. 9 is a block diagram to show an example of arrangement of PAR in a fourth embodiment of the present invention.

FIG. 9 is a block diagram to show an example of arrangement of PAR in the fourth embodiment of the present invention. Although the functions of PAR21 are shown by blocks in FIG. 9, these functions can be fulfilled by hardware and/or software. PAR21 shown in FIG. 9 comprises receiving means 1401, transmitting means 1402, RtSolPr processing means 1403, PrRtAdv generating means 1404, neighbor subnet information acquiring means 1405, neighbor subnet information storing means 1406, external transmission address requesting message processing means 1407, and external transmission address notifying message generating means 1408. The receiving means 1401, the transmitting means 1402, and the neighbor subnet information storing means 1406 are the same as the receiving means 1101, the transmitting means 1102, and the neighbor subnet information storing means 1106 as shown in FIG. 3 respectively. The PrRtAdv generating means 1404 and the external transmission address notifying message generating means 1408 are the same as the PrRtAdv generating means 1204 and the external transmission address notifying message generating means 1207 as shown in FIG. 5. The RtSolPr processing means 1403 and the external transmission address requesting message processing means 1407 are the same as the RtSolPr processing means 1303 and the external transmission address requesting message processing means 1307 as shown in FIG. 7.

The neighbor subnet information acquiring means 1405 is the means to acquire the external transmission address relating to the subnet 30 by receiving an instruction to acquire the external transmission address relating to the subnet 30 from the external transmission address requesting message processing means 1407 and to notify the external transmission address relating to the subnet 30 as acquired to the external transmission address notifying message generating means 1408. The neighbor subnet information acquiring means 1405 has the same function as that of the neighbor subnet information acquiring means 1105 as shown in FIG. 3, and detailed description is not given here.

Figure 10A:
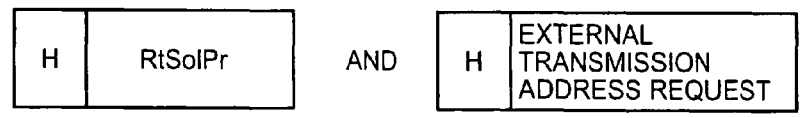
FIG. 10A represents diagrams to show information to request the external transmission address from MN to be processed in PAR shown in FIG. 9.
Figure 10B:
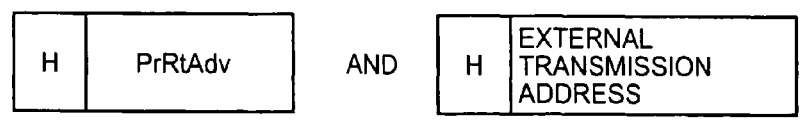
FIG. 10B represents diagrams to show an example of data arrangement of information to notify the external transmission address transmitted to MN and processed in PAR shown in FIG. 9.

FIG. 10A represents diagrams to show the request information of the external transmission address from MN to be processed in PAR shown in FIG. 9. FIG. 10B represents diagrams to show an example of data arrangement of the external transmission address transmitted to MN and processed in PAR shown in FIG. 9. The packet transmitted to PAR21 from MN10 as shown in FIG. 10A is the same as the one shown in FIG. 8A, and the packet transmitted to MN10 from PAR21 shown in FIG. 10B is the same as the one shown in FIG. 6B.

FIG. 11 is a block diagram to show an example of arrangement of MN in the fourth embodiment of the present invention. Although the functions of MN10 are shown by blocks in FIG. 11, these functions can be fulfilled by hardware and/or software. MN10 shown in FIG. 11 comprises radio receiving means 1411, radio transmitting means 1412, L2 handover determining means 1413, RtSolPr generating means 1414, PrRtAdv processing means 1415, external transmission address requesting message generating means 1416, and external transmission address notifying message processing means 1417.

The radio receiving means 1411 and the radio transmitting means 1412 are the means to perform radio communication with APs (AP22, AP23, AP32 and AP33) and to perform communication with PAR21 and NAR31 at superior positions and with arbitrary node connected to the IP network 15. The L2 handover determining means 1413 is the means to determine the execution of the handover to optimal AP (here, AP32 because it is assumed that MN performs the handover from AP23 to AP32) by judging the intensity of electric field issued from each of the APs.

The RtSolPr generating means 1414 is the means to generate the RtSolPr message including a link layer address of AP32 before performing the handover upon receipt of an instruction to execute the handover from L2 handover determining means 1413. It is also the means to include the link layer address of AP32 at the handover destination and to instruct the generation of a message to request the external transmission address relating to the subnet 30 at the handover destination (external transmission address requesting message) to the external transmission address requesting message generating means 1416. The external transmission address requesting message generating means 1416 is the means to generate an external transmission address requesting message by receiving an instruction to generate the external transmission address requesting message from the RtSolPr generating means 1414 (or an instruction to execute the handover to be sent from the L2 handover determining means 1413).

Both of the RtSolPr message in the RtSolPr generating means 1414 and the external transmission address requesting message in the external transmission address requesting message generating means 1416 are generated with the decision of the handover by the L2 handover determining means 1413 as trigger. The RtSolPr message and the external transmission address requesting message are transmitted to PAR21 from MN10, each as different packet, as shown in FIG. 10A.

The PrRtAdv processing means 1415 is the means to perform processing of the PrRtAdv message received from PAR21. That is, this is the same as the means to process the PrRtAdv message in the conventional FMIP. The external transmission address notifying message processing means 1417 is the means to perform processing of the external transmission address notifying message received from PAR21 and to extract an external transmission address relating to the subnet 30 among the external transmission address notifying message. After being processed by route setting means (not shown) 1417, the external transmission address processed by the external transmission address notifying message processing means 1417 is described in a setting column of a link local address as required within the default router list.

As described above, according to the fourth embodiment of the present invention, when MN10 performs the handover to different subnets 30, MN10 requests the external transmission address relating to the subnet 30 by transmitting the external transmission address requesting message to PAR21 connected before the handover, and PAR21 can notify the external transmission address relating to the subnet 30 acquired according to the external transmission address requesting message by transmitting the external transmission address notifying message. MN10 can acquire the external transmission address relating to the subnet 30 connected after the handover and can quickly transmit packet to outside immediately after the handover.

In the first to the fourth embodiment as given above, description has been given on 4 types of aspects to request the external transmission address relating to the subnet 30 to PAR21 by taking opportunity of the generation of the RtSolPr message (decision of the execution of the handover). In the fifth to the eighth embodiments as given below, description will be given on 4 types of aspects, in which the external transmission address relating to the subnet 30 is requested to PAR21 by taking opportunity of the generation of an FBU message (or the receiving of the PrRtAdv message).

5th Embodiment

Next, description will be given on the fifth embodiment of the present invention. FIG. 12 is a sequence chart to show principal processing common to the fifth to the eighth embodiments of the present invention. The sequence chart of FIG. 12 shows only the principal processing according to the present invention. The technique explained in the fifth to the eighth embodiments of the present invention can be carried out in combination with a first operation mode in FMIP as shown in FIG. 41 (operation mode when MN10 transmits the FBU message on a link before the handover).

In the sequence chart shown in FIG. 12, similarly to the prior art as shown in FIG. 41, MN10 first makes connection with the subnet 20 (Step S201). Under the connected condition, AP32 under the control of a new subnet 30 is discovered, and the execution of L2 handover to AP32 is determined (Step S203). Then, MN10 transmits the RtSolPr message including AP-ID of AP32 (Step S205). By receiving the PrRtAdv message from PAR21 (Step S207), it is possible to generate NCoA adaptable at the subnet 30 of the handover destination.

In addition to the FBU message including NCoA as given above, MN10 transmits information to request the external transmission address (Step S209). After receiving the FBU message, PAR21 retrieves access router present in the neighborhood as explained in the first to the fourth embodiments and acquires a link local address of NAR31 belonging to the subnet 30 or of a default router 37, or acquires a link local address of NAR31 belonging to the subnet 30 or of a default router 37 from the information already retrieved (information retained by PAR21), or acquires a link local address of NAR31 belonging to the subnet 30 or of the default router 37 (external transmission address by using other procedure (more concretely, the procedure to be explained in the ninth to the twelfth embodiments later) (Step S211).

Then, PAR21 notifies the external transmission address relating to the subnet 30 acquired in Step S211 to MN10 at the timing to transmit FBAck message including the information of NAR31 (Step S213). In so doing, MN10 can acquire the external transmission address relating to the subnet 30 from PAR21. Specifically, MN10 can quickly execute packet transmission to outside (e.g. CN40) in the subnet 30 by setting up the link local address of NAR31 acquired in advance by the procedure given above or the link local address of the default router 37 as default router immediately after the handover to the link of the subnet 30 (Step S215).

Figure 13:
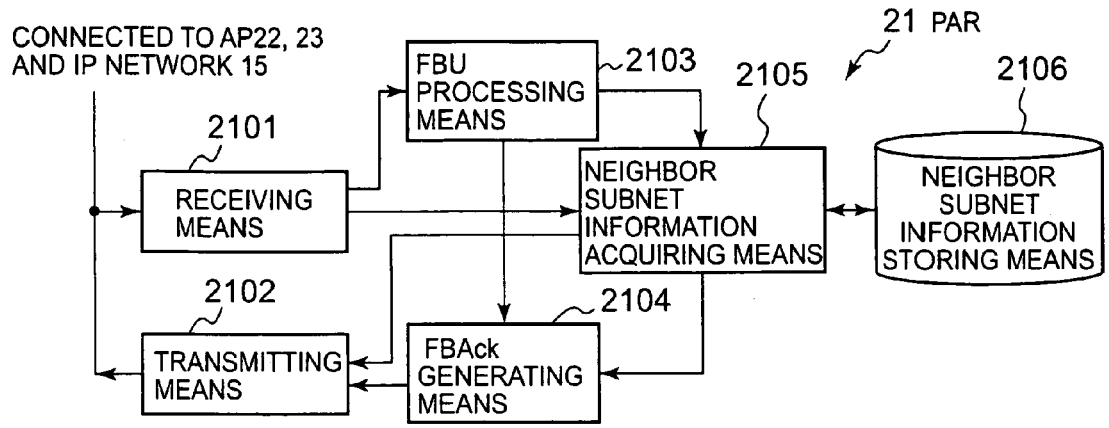
FIG. 13 is a block diagram to show an example of arrangement of PAR in the fifth embodiment of the present invention.

FIG. 13 is a block diagram to show an example of arrangement of PAR in the fifth embodiment of the present invention. Although the functions of PAR21 are shown by blocks in FIG. 13, these functions can be fulfilled by hardware and/or software. PAR21 shown in FIG. 13 comprises receiving means 2101, transmitting means 2102, FBU processing means 2103, FBAck generating means 2104, neighbor subnet information acquiring means 2105, and neighbor subnet information storing means 2106. PAR21 is provided with various types of functions: a function as the RtSolPr processing means to perform processing on the RtSolPr message received from MN10, a function as the PrRtAdv generating means to generate the PrRtAdv message transmitted to MN10, a function as HI processing means to generate HI message transmitted to NAR31, and a function as HAck processing means to process HAck message received from NAR31, etc. However, detailed description and illustrations are not given here.

Figure 14A:
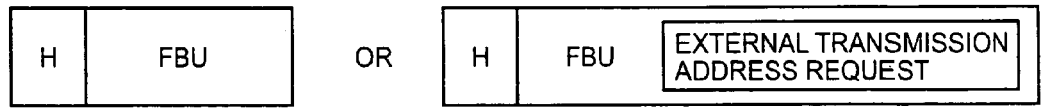
FIG. 14A represents diagrams to show information to request the external transmission address from MN to be processed in PAR shown in FIG. 13.

PAR21 as shown in FIG. 13 may be explained as the replacement of PAR21 shown in FIG. 3, i.e. by replacing the RtSolPr processing means 1103 with the FBU processing means 2103 and also as the replacement of PAR21 shown in FIG. 3, i.e. by replacing the PrRtAdv generating means 1104 with the FBAck generating means 2104. Specifically, as shown in FIG. 14A, PAR21 receives the conventional FBU message or the FBU message added with information to instruct the request of the external transmission address.

Figure 14B:
FIG. 14B represents a diagram to show an example of data arrangement of information to notify the external transmission address transmitted to MN and processed in PAR shown in FIG. 13.

For example, PAR21 may be so arranged that it receives FBAck message including the external transmission address as shown in FIG. 14B when the conventional type FBU message is received (i.e. the conventional FBU message plays a role as information to request the external transmission address). Or, PAR21 is so arranged that it transmits FBAck message including the external transmission address shown in FIG. 14B in case the information to instruct the request of the external transmission address is added by verifying whether the information to instruct the request of the external transmission address defined within FBU message is present or not.

Although not shown in the figures, for the purpose of achieving the fifth embodiment of the invention, MN10 must have the means to extract the external transmission address from the FBAck message received from PAR21. In case PAR21 is so arranged that it transmits FBAck message including the external transmission address to MN10, which has sent the FBU message added with the information to instruct the request of the external transmission address, MN10 must have the means to insert the information to instruct the request of the external transmission address in the FBU message, although not shown in the figures.

As described above, according to the fifth embodiment of the present invention, when MN10 executes the handover to different subnets 30, MN10 can request the external transmission address relating to the subnet 30 by transmitting the FBU message to PAR21 connected before the handover, and PAR21 can notify the external transmission address relating to the subnet 30 by transmitting the FBAck message, which is a response message. MN10 can acquire the external transmission address relating to the subnet 30 connected after the handover and can quickly perform packet transmission to outside immediately after the handover.

6th Embodiment

Figure 15:
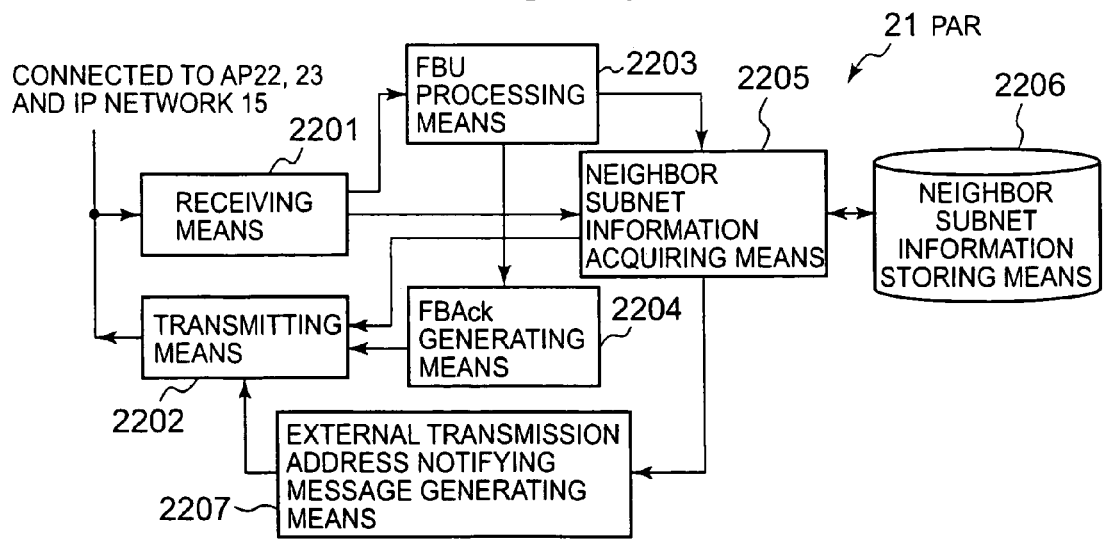
FIG. 15 is a block diagram to show an example of arrangement of PAR in a sixth embodiment of the present invention.

Next, description will be given on the sixth embodiment of the present invention. The sixth embodiment of the present invention has a matching relation with the second embodiment as described above. This matching relation is the same as the matching relation between the first embodiment and the fifth embodiment. Specifically, PAR21 as shown in FIG. 15 gives the instruction to generate FBAck to the FBAck generating means 2204. The FBU processing means 2203 instructs the generation of FBAck to the FBAck generating means 2204 when the FBU message is received. It requests the acquisition of the external transmission address relating to the subnet 30 to the neighbor subnet information acquiring means 2205. The neighbor subnet information acquiring means 2205 supplies the acquired external transmission address to the external transmission address notifying message generating means 2207, and it is so arranged that the external transmission address notifying message is generated in addition to the FBAck message at the external transmission address notifying message generating means 2207.

Figure 16A:
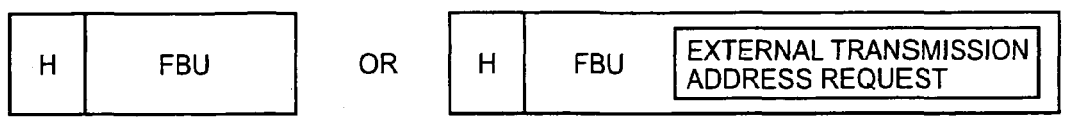
FIG. 16A represents diagrams to show information to request the external transmission address from MN to be processed in PAR shown in FIG. 15.
Figure 16B:
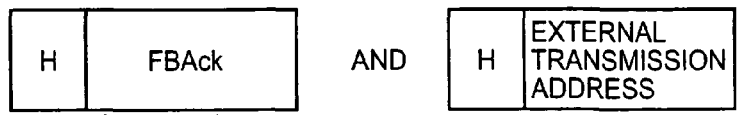
FIG. 16B represents diagrams to show an example of data arrangement of information to notify the external transmission address transmitted to MN and processed in PAR shown in FIG. 15.

Specifically, PAR21 is so arranged that it transmits the FBAck message and the external transmission address notifying message to MN10 as shown in FIG. 16B when the conventional FBU message shown in FIG. 16A or the FBU message including the request of the external transmission address is received. Except that there is a difference between the RtSolPr message and the FBU message and a difference between the PrRtAdv message and the FBAck message, the details of data processing and the details of the data arrangement in the sixth embodiment of the present invention as well as the arrangement necessary in MN10 are the same as in the second embodiment as given above.

As described above, according to the sixth embodiment of the present invention, when MN10 executes the handover to different subnets 30, MN10 requests the external transmission address relating to the subnet 30 by transmitting the FBU message to PAR21 connected before the handover, and PAR21 can notify the external transmission address relating to the subnet 30 by transmitting the external transmission address notifying message different from the FBAck message, which is a response message. MN10 can acquire the external transmission address relating to the subnet 30 connected after the handover on a link of the subnet 20 connected before the handover and can quickly execute packet transmission to outside immediately after the handover.

7th Embodiment

Figure 17:
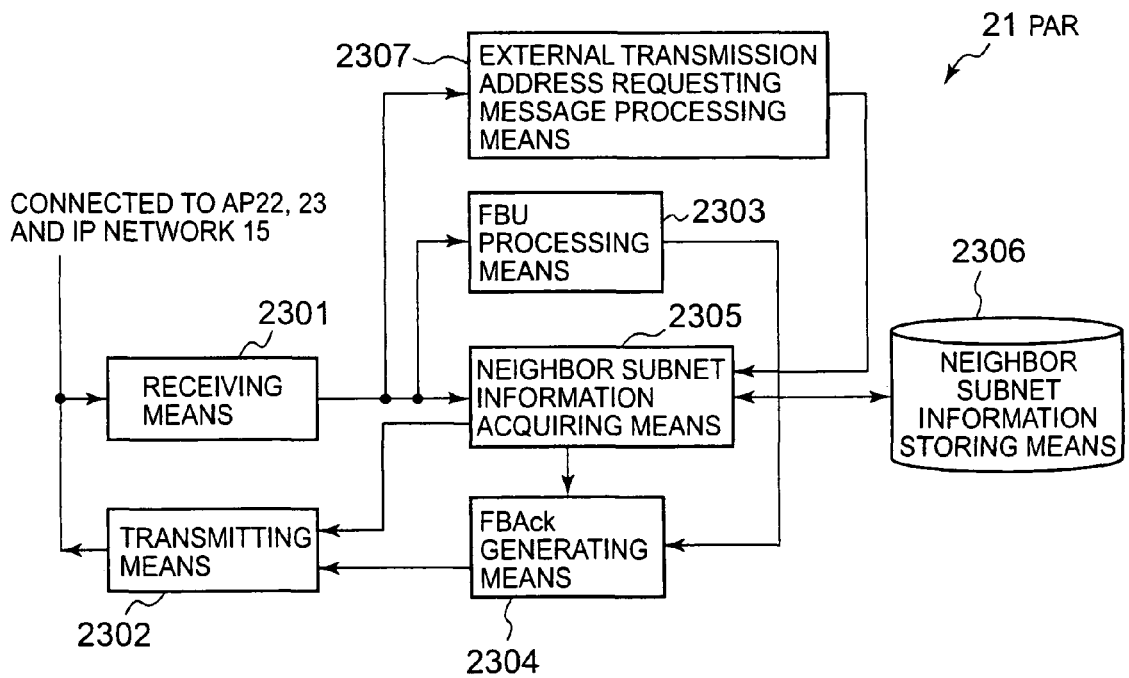
FIG. 17 is a block diagram to show an example of arrangement of PAR in a seventh embodiment of the present invention.

Next, description will be given on the seventh embodiment of the present invention. The seventh embodiment of the present invention has a matching relation with the third embodiment as described above, and this matching relation is the same as the matching relation of the first embodiment with the fifth embodiment. That is, when PAR21 as shown in FIG. 17 receives the FBU message and the external transmission address requesting message, the FBU generating means 2303 instructs the generation of FBAck to the FBAck generating means 2304, and the external transmission address requesting message processing means 2307 requests the acquisition of the external transmission address relating to the subnet 30 to the neighbor subnet information acquiring means 2305. The neighbor subnet information acquiring means 2305 supplies the external transmission address as acquired to the FBAck generating means 2304, and the FBAck message including the external transmission address is generated.

Figure 18A:
FIG. 18A represents diagrams to show information to request the external transmission address from MN as to be processed in PAR shown in FIG. 17.
Figure 18B:
FIG. 18B is a diagram to show an example of data arrangement of information to notify the external transmission address transmitted to MN and processed in PAR shown in FIG. 17.

Specifically, when PAR21 receives the conventional FBU message as shown in FIG. 18A and the external transmission address requesting message, it is so arranged that it transmits an FBAck message including the external transmission address to MN10 as shown in FIG. 18B. Except that there is a difference between the RtSolPr message and the FBU message and a difference between the PrRtAdv message and the FBAck message, the details of data arrangement and the details of data processing in the seventh embodiment of the present invention as well as the arrangement necessary in MN10 are the same as those of the third embodiment as described above.

As described above, according to the seventh embodiment of the present invention, when MN10 executes the handover to different subnets 30, MN10 requests the external transmission address relating to the subnet 30 by transmitting the external transmission address requesting message to PAR 21 connected before the handover, and PAR21 can notify the external transmission address relating to the subnet 30 acquired according to the external transmission address requesting message by transmitting the FBAck message. MN10 can acquire the external transmission address relating to the subnet 30 connected after the handover and can quickly execute packet transmission to outside immediately after the handover.

8th Embodiment

Figure 19:
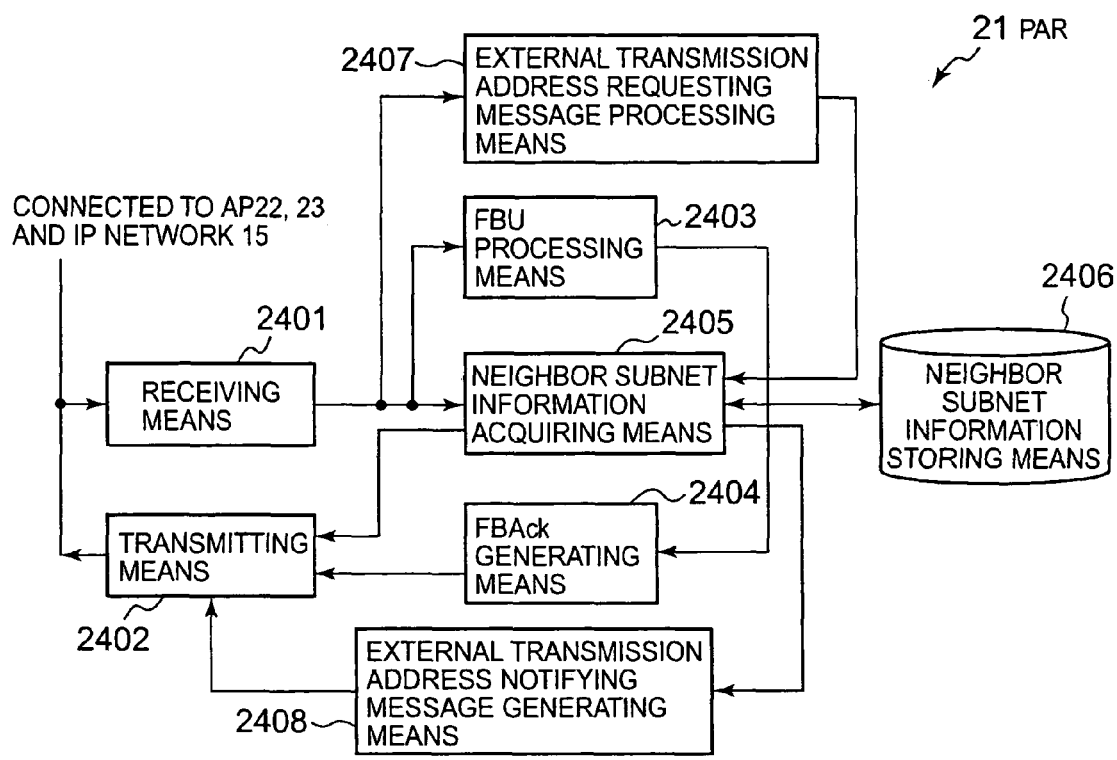
FIG. 19 is a block diagram to show an example of arrangement of PAR in an eighth embodiment of the present invention.

Next, description will be given on the eight embodiment of the present invention. The eighth embodiment of the present invention has a matching relation with the fourth embodiment as described above, and this matching relation is the same as the matching relation of the first embodiment with the fifth embodiment. Specifically, when PAR21 shown in FIG. 19 receives the FBU message and the external transmission address requesting message, the FBU processing means 2403 instructs the generation of FBAck to the FBAck generating means 2404. The external transmission address requesting message processing means 2407 requests the acquisition of the external transmission address relating to the subnet 30 to the neighbor subnet information acquiring means 2405. It is so arranged that the neighbor subnet information acquiring means 2405 supplies the external transmission address as acquired to the external transmission address notifying message generating means 2408 so that the external transmission address notifying message is generated, in addition to the FBAck message, at the external transmission address notifying message generating means 2408.

Figure 20A:
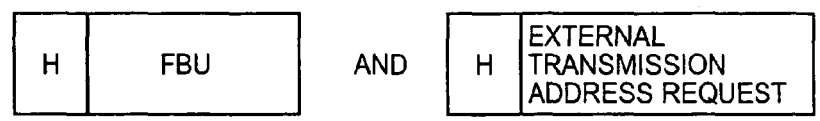
FIG. 20A represents diagrams to show request information of the external transmission address from MN as to be processed in PAR shown in FIG. 19.
Figure 20B:
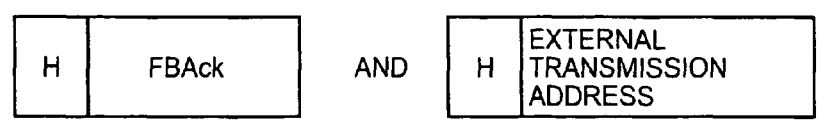
FIG. 20B represents diagrams to show an example of data arrangement of a notifying information of the external transmission address to be transmitted to MN and processed in PAR shown in FIG. 19.

Specifically, when PAR21 receives the conventional FBU message as shown in FIG. 20A and the external transmission address requesting message, it is so arranged that PAR21 transmits the FBAck message and the external transmission address notifying message to MN10 as shown in FIG. 20B. Except that there is a difference between the RtSolPr message and the FBU message and there is a difference between the PrRtAdv message and the FBAck message, the details of data arrangement and the details of data processing in the eighth embodiment of the present invention as well as the arrangement necessary in MN10 are the same as those of the fourth embodiment as given above.

As described above, according to the eighth embodiment of the present invention, when MN10 executes the handover to different subnets 30, MN10 requests the external transmission address relating to the subnet 30 by transmitting the external transmission address requesting message to PAR21 connected before the handover, and PAR21 can notify the external transmission address relating to the subnet 30 acquired according to the external transmission address requesting message by transmitting the external transmission address notifying message. MN10 can acquire the external transmission address relating to the subnet 30 connected after the handover and can quickly execute packet transmission to outside immediately after the handover.

Also, it can be so arranged that, by combining the first to the fourth embodiments as given above with the fifth to the eighth embodiments, PAR21 can notify the external transmission address relating to the subnet 30 as requested from MN10 to MN10 when the RtSolPr message is received.

In the fifth to the eighth embodiments as given above, description has been given on 4 types of aspects to request the external transmission address relating to the subnet 30 to PAR21 by taking opportunity of the generation of the FBU message (or the receiving of the PrRtAdv message). In the fifth to eighth embodiments, there is no special restriction on the procedure to acquire the external transmission address relating to the subnet 30 at each of the neighbor subnet information acquiring means 2105, 2205, 2305 and 2405 of PAR21. In the ninth to the twelfth embodiments as given below, description will be given on the procedure, in which the procedure to acquire the external transmission address relating to the subnet 30 at each of the neighbor subnet information acquiring means 2105, 2205, 2305, and 2405 in the fifth to the eighth embodiments is carried out in association with transmitting and receiving of the HI message and the HAck message between PAR21 and NAR31 as defined in the conventional FMIP.

9th Embodiment

Next, description will be given on the ninth embodiment of the present invention. FIG. 21 is a sequence chart to show principal processing common to the ninth to the twelfth embodiments of the present invention. In the sequence chart of FIG. 21, only the principal processing according to the present invention is shown. The technique to be explained in connection with the ninth to the twelfth embodiments of the present invention can be carried out in combination with the case where the HI message and the HAck message are given and taken between PAR21 and NAR31 in the first operation mode in FMIP as shown in FIG. 41 (the operation mode in the case where MN10 transmits the FBU message on a link before the handover).

The sequence chart shown in FIG. 21 is basically the same as the sequence chart shown in FIG. 12. However, in contrast to the sequence chart of FIG. 12 where there is no special restriction on the external transmission address relating to the subnet in Step S211, in the sequence chart of FIG. 21, PAR21 requests the external transmission address to NAR31 at the time of transmitting of the HI message to NAR31 (Step S311), and NAR31 notifies the external transmission address to PAR21 when transmitting the HAck message, which is a response of the HI message (Step S313).

Then, PAR2 notifies the external transmission address relating to the subnet 30 to MN10 at the time of transmission of the FBAck message including the information of NAR31 (Step S317). As a result, MN10 can acquire the external transmission address relating to the subnet 30 from PAR21. That is, immediately after executing the handover to the link of the subnet 30 (Step S319), MN10 can set up a link local address of NAR31 acquired in advance by the procedure as given above or a link local address of a default router 37 to the transmission packet and can quickly execute packet transmission to outside (e.g. to CN40) in the subnet 30.

FIG. 22 is a block diagram to show an example of arrangement of PAR in the ninth embodiment of the present invention. Although the functions of PAR21 are shown by blocks in FIG. 22, these functions can be fulfilled by hardware and/or software. PAR21 shown in FIG. 22 comprises receiving means 3101, transmitting means 3102, FBU processing means 3103, FBAck generating means 3104, and neighbor information acquiring means 3105. The neighbor subnet information acquiring means 3105 has HI generating means 3106 to generate the HI message and HAck processing means 3107 to perform processing of the HAck message.

PAR21 as explained in the ninth embodiment of the present invention transmits and receives the HI message and the HAck message when a request of the external transmission address is received by the FBU message from MN10. Then, it acquires the external transmission address relating to the subnet 30, which is the handover destination of MN10, by utilizing the transmitting and the receiving of the HI message and the HAck message and transmits the FBAck message including the external transmission address to MN10. Therefore, PAR21 as explained in the ninth embodiment of the present invention may be regarded as an aspect of PAR21 as explained in the fifth embodiment. In particular, it is so arranged that the HI message and the HAck message can be used with regard to the function of the neighbor subnet information acquiring means 2105 as shown in FIG. 13.

Description will be given below on the arrangement of PAR21 shown in FIG. 22 by comparing with the arrangement of PAR21 shown in FIG. 13. PAR21 shown in FIG. 22 comprises receiving means 3101, transmitting means 3102, FBU processing means 3103, and FBAck generating means 3104, and these are basically the same as the receiving means 2101, the transmitting means 2102, the FBU processing means 2103, and the FBAck generating means 2104 shown in FIG. 13.

The HI generating means 3106 of PAR21 shown in FIG. 22 is the means to generate HI message in the conventional FMIP or HI message including the request of the external transmission address. The generation of the HI message by the HI generating means 3106 is carried out at the instruction to generate the HI message as supplied from the FBU processing means 3103. The HI message generated by the HI generating means 3106 is transmitted to NAR31 via the transmitting means 3102. From NAR31, the HAck message including the external transmission address relating to the subnet 30 is received. Processing of the HAck message is performed by the HAck processing means 3107. From the HAck processing means 3107, an instruction to generate FBAck is sent to the FBAck generating means 3104 together with the external transmission address relating to the subnet 30 extracted from the HAck message. As a result, the FBAck generating means 3104 can generate the FBAck message including the external transmission address of the subnet 30.

Figure 23:
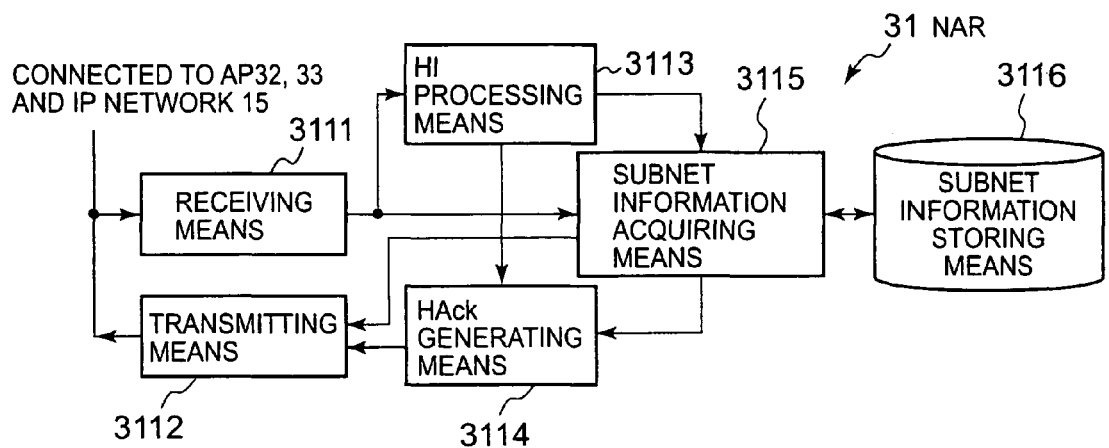
FIG. 23 is a block diagram to show an example of arrangement of NAR in the ninth embodiment of the present invention.

FIG. 23 is a block diagram to show an example of arrangement of NAR in the ninth embodiment of the present invention. Although the functions of NAR31 are shown by blocks in FIG. 23, these functions can be fulfilled by hardware and/or software. NAR23 shown in FIG. 23 comprises receiving means 3111, transmitting means 3112, HI processing means 3113, HAck generating means 3114, subnet information acquiring means 3115, and subnet information storing means 3116.

When an HI message is received from PAR21, NAR31 shown in FIG. 23 performs processing by HI processing means 3113 (such as verification processing of NCoA) and gives an instruction to generate HAck message to the HAck generating means 3114, and requests the acquisition of the external transmission address relating to the subnet (NAR31's own subnet) to the subnet information acquiring means 3115. The subnet information acquiring means 3115 reads its own link local address in the subnet 30 or a link local address of the default router 37 from the subnet information storing means 3116 or performs communication with other route in the subnet 30 and acquires the link local address of the default router 37 in the subnet 30, and the results of the acquisition are notified to the HAck generating means 3114. As a result, the HAck generating means 3114 can generate the HAck message including the external transmission address relating to the subnet 30.

Figure 24A:
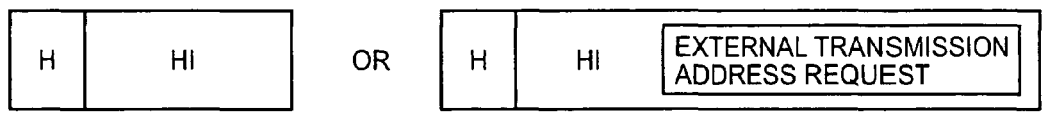
FIG. 24A represents diagrams to show request information of the external transmission address to be given and taken between PAR shown in FIG. 22 and NAR shown in FIG. 23.
Figure 24B:
FIG. 24B is a diagram to show an example of data arrangement of a notifying information of the external transmission address to be given and taken between PAR shown in FIG. 22 and NAR shown in FIG. 23.

FIG. 24A represents diagrams to show request information of the external transmission address to be given and taken between PAR shown in FIG. 22 and NAR shown in FIG. 23. FIG. 24B is a diagram to show an example of data arrangement of the notifying information of the external transmission address to be given and taken between PAR shown in FIG. 22 and NAR shown in FIG. 23. It is so arranged that PAR21 transmits the HI message in the conventional FMIP as shown in FIG. 24A (in this case, the conventional HI message plays a role of information to request the external transmission address) or it transmits the HI message including the request of the external transmission address. Upon receipt of the HI message, NAR31 transmits the HAck message including the external transmission address as shown in FIG. 24B.

As described above, according to the ninth embodiment of the present invention, when MN10 executes the handover to different subnets 30, when receiving the external transmission address relating to the subnet 30 from MN10, PAR21 requests the external transmission address relating to the subnet 30. NAR31 can notify the external transmission address relating to the subnet 30 by transmitting an HAck message, which is its response message. PAR21 notifies the external transmission address relating to the subnet 30 as acquired to MN10. Then, MN10 can acquire the external transmission address relating to the subnet 30 connected after the handover and can quickly execute packet transmission to outside immediately after the handover.

It has been already described that, in PAR21 shown in FIG. 22, the neighbor subnet information acquiring means 2105 in the fifth embodiment (PAR21 shown in FIG. 13) can acquire the external transmission address relating to the subnet 30 at the time of transmitting and receiving of the HI message and the HAck message. It can also be so arranged that, with regard to the neighbor subnet information acquiring means 2205, 2305 and 2405, in the sixth to the eighth embodiments (PAR21 shown in each of FIGS. 15, 17 and 19), PAR21 can acquire the external transmission address relating to the subnet 30 at the time of transmitting and receiving the HI message and the HAck message.

10th Embodiment

Next, description will be given on the tenth embodiment of the present invention. The operation in the tenth embodiment of the invention is the same as the operation explained in the above referring to the sequence chart of FIG. 21, and detailed description is not given here.

Figure 25:
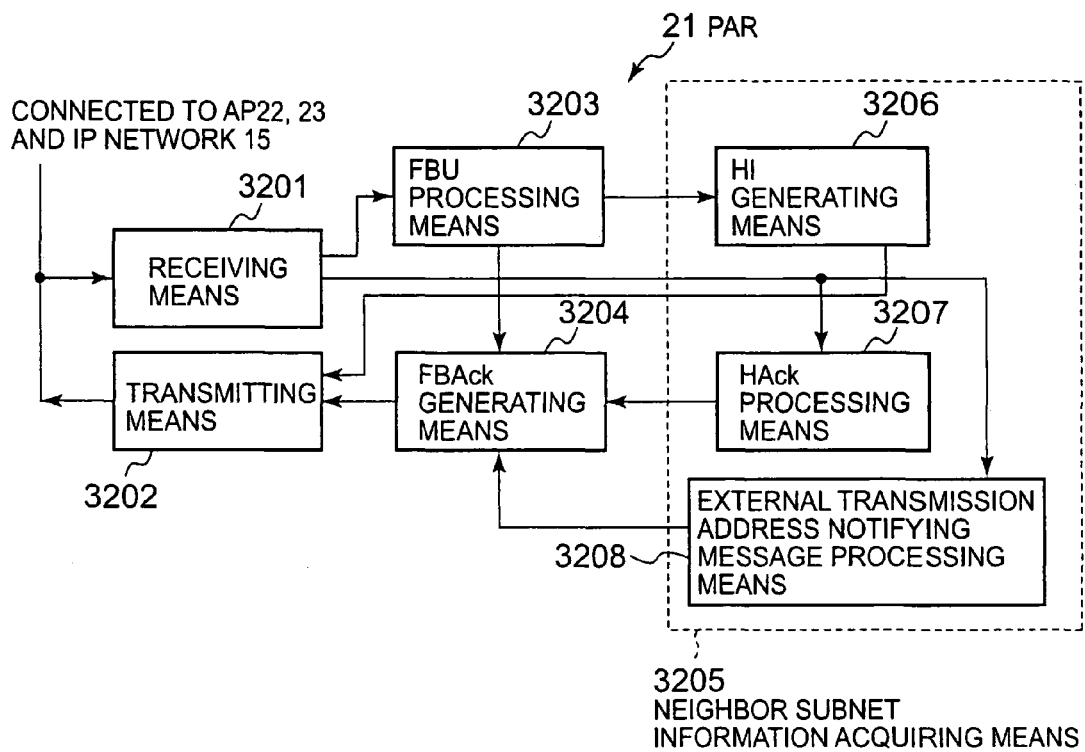
FIG. 25 is a block diagram to show an example of arrangement of PAR in a tenth embodiment of the present invention.

FIG. 25 is a block diagram to show an example of arrangement of PAR in the tenth embodiment of the invention. Although the functions of PAR21 are shown by blocks in FIG. 25, these functions can be fulfilled by hardware and/or software. PAR21 shown in FIG. 25 comprises receiving means 3201, transmitting means 3202, FBU processing means 3203, FBAck generating means 3204, and neighbor subnet information acquiring means 3205. The neighbor subnet information acquiring means 3205 has HI generating means 3206 for generating the HI message, HAck processing means 3207 for performing processing of the HAck message, and external transmission address notifying message processing means 3208 for processing the external transmission address notifying message including the external transmission address received from NAR31.

In PAR21 as to be explained in the tenth embodiment of the invention, when a request of the external transmission address is received by an FBU message from MN10, PAR21 transmits and receives the HI message and the HAck message and acquires the external transmission address relating to the subnet 30, which is the handover destination of MN10, and it transmits FBAck message including the external transmission address to MN10. Thus, this can be regarded as one aspect of PAR21, which has been explained in the fifth embodiment in the above.

Description will be given below on the arrangement of PAR21 shown in FIG. 25 by comparing with the arrangement of PAR21 shown in FIG. 13. Similarly to the ninth embodiment as given above, PAR21 shown in FIG. 25 has receiving means 3201, transmitting means 3202, FBU processing means 3203 and FBAck generating means 3204, and these are basically the same as the receiving means 2101, the transmitting means 2102, the FBU processing means 2103, and the FBAck generating means 2104.

The HI generating means 3206 of PAR21 shown in FIG. 25 is the same as the HI generating means 3106 shown in FIG. 22, and this is the means to generate an HI message in the conventional FMIP or an HI message including the external transmission address request. Similarly to the ninth embodiment, PAR21 transmits the HI message generated by the HI generating means 3206 to NAR31 and receives the HAck message, which is a response of the HI message, and external transmission address notifying message including the external transmission address relating to the subnet 30. In PAR21, the HAck message received from NAR31 is the same as the HAck message defined in the conventional FMIP, and it is processed by the HAck processing means 3207. On the other hand, the external transmission address notifying message received from NAR31 is processed by the external transmission address notifying message processing means 3208. The external transmission address notifying message processing means 3208 extracts the external transmission address relating to the subnet 30 from the external transmission address notifying message and supplies this external transmission address relating to the subnet 30 as extracted to the FBAck generating means 3204. In so doing, the FBAck generating means 3204 can generate an FBAck message including the external transmission address of the subnet 30.

Figure 26:
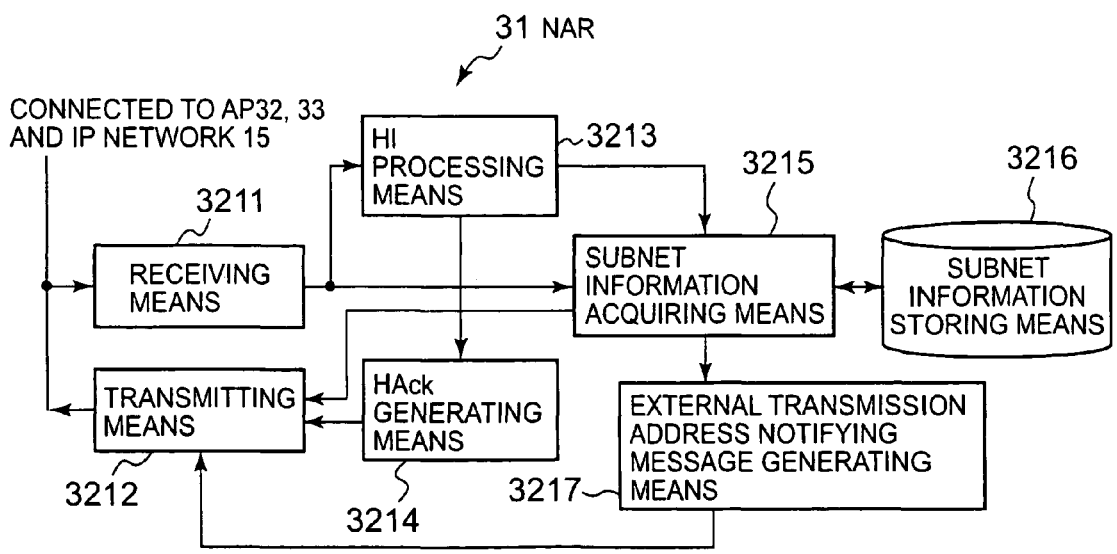
FIG. 26 is a block diagram to show an example of arrangement of NAR in the tenth embodiment of the present invention.

FIG. 26 is a block diagram to show an example of arrangement of NAR in the tenth embodiment of the present invention. Although the functions of NAR31 is shown by blocks in FIG. 26, these functions can be fulfilled by hardware and/or software. NAR31 shown in FIG. 26 comprises receiving means 3211, transmitting means 3212, HI processing means 3213, HAck generating means 3214, subnet information acquiring means 3215, subnet information storing means 3216, and external transmission address notifying message generating means 3217.

Similarly to NAR31 shown in FIG. 23, in NAR31 shown in FIG. 26 when HI message is received from PAR21, the HI processing means 3213 performs processing of the HI message and instructs the generation of the HAck message to the HAck generating means 3214 and requests the acquisition of the external transmission address relating to the subnet 30 to the subnet information acquiring means 3215, and the subnet information acquiring means 3215 acquires the external transmission address relating to he subnet 30. Then, the subnet information acquiring means 3215 notifies the result of the acquisition to the external transmission address notifying message generating means 3217. As a result, the HAck generating means 3214 can generate the external transmission address notifying message including the external transmission address relating to the subnet 30.

Figure 27A:
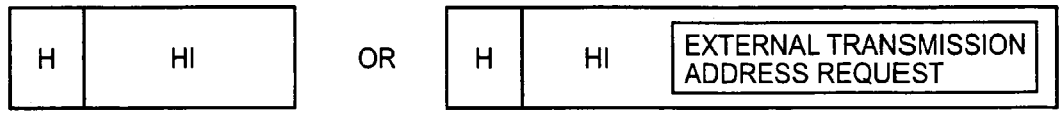
FIG. 27A represents diagrams to show request information of the external transmission address to be given and taken between PAR shown in FIG. 25 and NAR shown in FIG. 26.
Figure 27B:
FIG. 27B represents diagrams to show an example of data arrangement of a notifying information of the external transmission address to be given and taken between PAR shown in FIG. 25 and NAR shown in FIG. 26.

FIG. 27A represents diagrams to show the request information of the external transmission address to be given and taken between PAR shown in FIG. 25 and NAR shown in FIG. 26. FIG. 27B represents diagrams to show an example of data arrangement of the notifying information of the external transmission address to be given and taken between PAR shown in FIG. 25 and NAR shown in FIG. 26. It is so arranged that PAR21 transmits the HI message in the conventional FMIP shown in FIG. 27A and the HI message including the request of the external transmission address. Also, it is so arranged that NAR31 transmits the HAck message in the conventional FMIP and the external transmission address notifying message including the external transmission address relating to the subnet 30.

As described above, according to the tenth embodiment of the present invention, when MN10 executes the handover to different subnets 30, when receiving the external transmission address relating to the subnet 30 from MN10, PAR21 transmits the HI message to NAR31 and requests the external transmission address relating to the subnet 30. Then, NAR31 can notify the external transmission address relating to the subnet 30 by transmitting an external transmission address notifying message different from the HAck message, which is its response message. PAR21 notifies the external transmission address relating to the subnet 30 as acquired to MN10. Then, MN10 can acquire the external transmission address relating to the subnet 30 connected after the handover and can quickly execute packet transmission to outside immediately after the handover.

Description has been given in the above on a case where it is so arranged in PAR21 shown in FIG. 25 that, similarly to the case of the ninth embodiment, the neighbor subnet information acquiring means 2105 can acquire the external transmission address relating to the subnet 30 at the time of transmitting and receiving of the HI message and the HAck message in PAR21 in the fifth embodiment (PAR21 as shown in FIG. 13). However, it can also be so arranged that, with regard to the neighbor information acquiring means 2205, 2305 and 2405, PAR21 in the sixth to the eighth embodiments (PAR21 shown in each of FIGS. 15, 17 and 19) can acquire the external transmission address relating to the subnet 30 at the time of transmitting and receiving of the HI message and the HAck message.

11th Embodiment

Next, description will be given on the eleventh embodiment of the present invention. The operation in the eleventh embodiment of the invention is the same as the operation explained in the above by referring to the sequence chart of FIG. 21, and detailed description is not given here.

Figure 28:
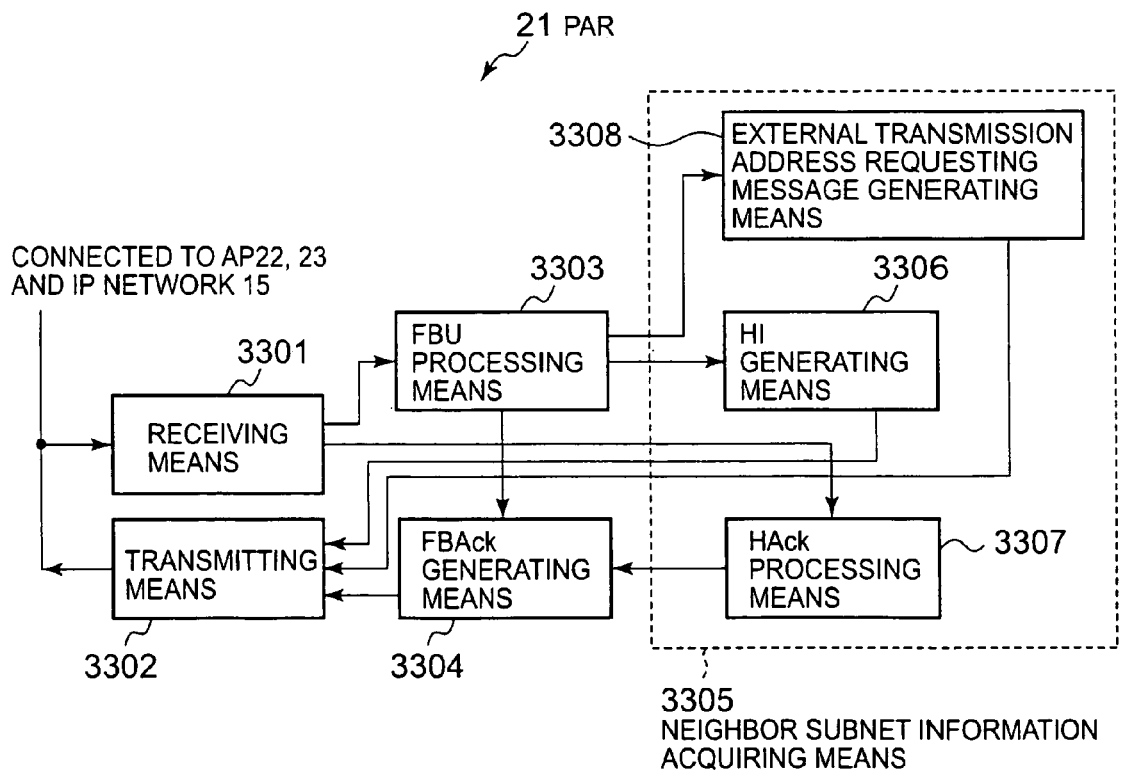
FIG. 28 is a block diagram to show an example of arrangement of PAR in an eleventh embodiment of the present invention.

FIG. 28 is a block diagram to show an example of arrangement of PAR in the eleventh embodiment of the present invention. Although the functions of PAR2 are shown by blocks in FIG. 28, these functions can be fulfilled by hardware and/or software. PAR21 shown in FIG. 28 comprises receiving means 3301, transmitting means 3302, FBU processing means 3303, FBAck generating means 3304, and neighbor information acquiring means 3305. The neighbor subnet information acquiring means 3305 has HI generating means 3306 for generating HI message, HAck processing means 3307 for performing processing of HAck message, and external transmission address requesting message generating means 3308 for generating external transmission address requesting message to request external transmission address to NAR31.

PAR21 as explained in the eleventh embodiment of the invention may be regarded as one aspect of PAR21 explained in connection with the fifth embodiment. The reasons are as follows: When a request of the external transmission address is received from MN10 by FBU message, HI message and HAck message are given, and PAR21 acquires the external transmission address relating to the subnet 30, which is handover destination of MN10 by utilizing the transmitting and the receiving of the HI message and the HAck message, and an FBAck message including the external transmission address is transmitted to MN10.

Description will be given below on the arrangement of PAR21 shown in FIG. 28 by comparing with the arrangement of PAR21 shown in FIG. 13. Similarly to the ninth embodiment as given above, the receiving means 3301, the transmitting means 3302, the FBU processing means 3303, and the FBAck generating means 3304 of PAR21 shown in FIG. 28 are basically the same as the receiving means 2101, the transmitting means 2102, the FBU processing means 2103, and the FBAck generating means 2104 shown in FIG. 13 respectively.

The HI generating means 3306 of PAR21 shown in FIG. 28 is the same as the HI generating means 3106 shown in FIG. 22, and it is the means to generate the HI message in the conventional FMIP or the HI message including the request of the external transmission address. After processing the FBU message from MN10, the FBU processing means 3303 of PAR21 sends an instruction to generate the HI message to the HI generating means 3306 and also gives an instruction to generate the external transmission address requesting message to request the external transmission address relating to the subnet 30 to the external transmission address requesting message generating means 3308, and it transmits the HI message generated at the HI generating means 3306 and the external transmission address requesting message generated at the external transmission address requesting message generating means 3308. NAR31 acquires the external transmission address relating to the subnet 30 according to the HI message received from PAR21 and the external transmission address requesting message and generates an HAck message including the result of the acquisition and transmits it to PAR21. The HAck processing means 3307 of PAR21 extracts the external transmission address relating to the subnet 30 from the HAck message received from NAR31 and sends the external transmission address relating to the subnet 30 as extracted to the FBAck generating means 3304. As a result, the FBAck generating means 3304 can generate the FBAck message including the external transmission address of the subnet 30.

Figure 29:
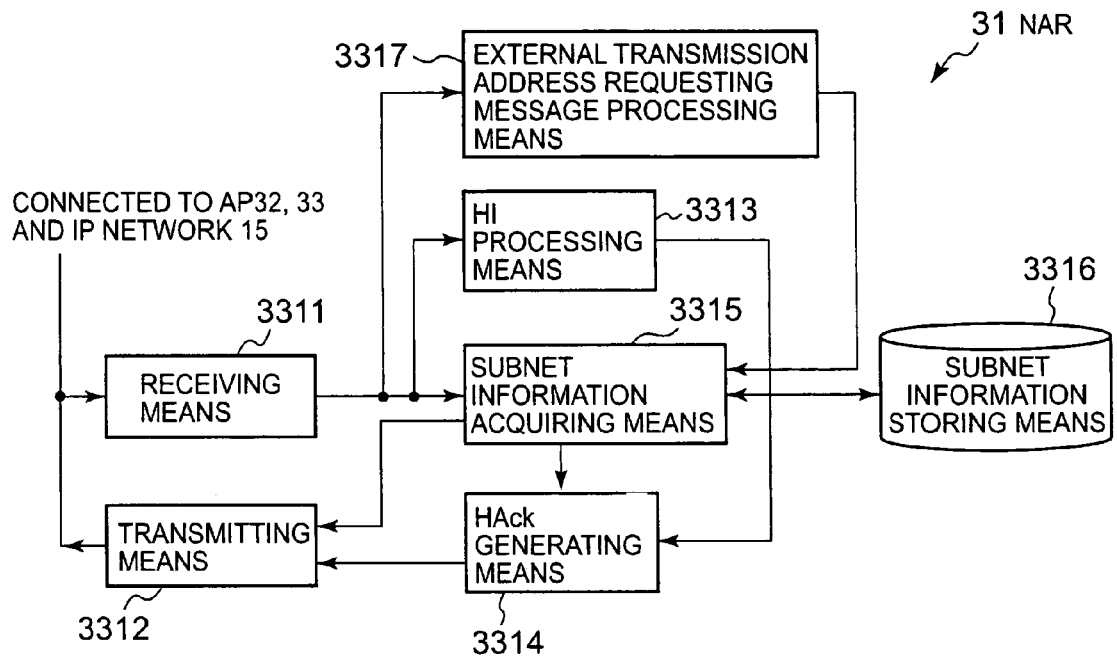
FIG. 29 is a block diagram to show an example of arrangement of NAR in the eleventh embodiment of the present invention.

FIG. 29 is a block diagram to show an example of arrangement of NAR in the eleventh embodiment of the present invention. Although the functions of NAR31 are shown by blocks in FIG. 29, these functions can be fulfilled by hardware and/or software. NAR31 shown in FIG. 29 comprises receiving means 3311, transmitting means 3312, HI processing means 3313, HAck generating means 3314, subnet information acquiring means 3315, subnet information storing means 3316, and external transmission address requesting message processing means 3317.

In NAR31 shown in FIG. 29, when the HI message and the external transmission address requesting message are received from PAR21, the HI processing means 3313 processes the HI message and gives an instruction to generate HAck message to the HAck generating means 3314. The external transmission address requesting message processing means 3317 receives the external transmission address requesting message and requests the acquisition of the external transmission address relating to the subnet 30 to the subnet information acquiring means 3315. Then, similarly to the ninth embodiment as given above, the subnet information acquiring means 3315 acquires the external transmission address relating to the subnet 30 and notifies the result of the acquisition to the HAck generating means 3314. As a result, the HAck generating means 3314 can generate the HAck message including the external transmission address relating to the subnet 30.

Figure 30A:
FIG. 30A represents diagrams to show request information of the external transmission address to be given and taken between PAR shown in FIG. 28 and NAR shown in FIG. 29.
Figure 30B:
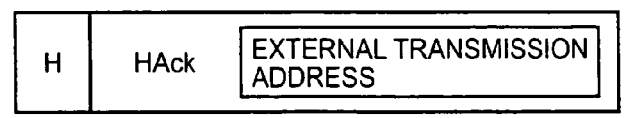
FIG. 30B is a diagram to show an example of data arrangement of a notifying information of the external transmission address to be given and taken between PAR shown in FIG. 28 and NAR shown in FIG. 29.

FIG. 30A represents diagrams to show the request information of the external transmission address to be given and taken between PAR shown in FIG. 28 and NAR shown in FIG. 29. FIG. 30B is a diagram to show an example of data arrangement of the notifying information of the external transmission address to be given and taken between PAR shown in FIG. 28 and NAR shown in FIG. 29. PAR21 is so arranged that it transmits the HI message in the conventional FMIP shown in FIG. 30A and the external transmission address requesting message. NAR31 is so arranged that it transmits the HAck message including the external transmission address relating to the subnet 30 to PAR21 as shown in FIG. 30B.

As described above, according to the eleventh embodiment of the present invention, when MN10 executes the handover to different subnets 30, after receiving the external transmission address relating to the subnet 30 from MN10, PAR21 requests the external transmission address relating to the subnet 30 by transmitting an external transmission address requesting message different from the HI message to NAR31. NAR31 can notify the external transmission address relating to the subnet 30 by transmitting the HAck message. By notifying the external transmission address relating to the subnet 30 as acquired to MN10, PAR21 acquires the external transmission address relating to the subnet 30 connected after the handover on a link of the subnet connected before the handover and can quickly execute packet transmission to outside immediately after the handover.

Similarly to the case of the ninth embodiment as given above, description has been given on a case where it is so arranged in PAR21 shown in FIG. 28 that neighbor subnet information acquiring means 2105 in PAR21 of the fifth embodiment (PAR21 shown in FIG. 13) can acquire the external transmission address relating to the subnet 30 at the time of transmitting and receiving of the HI message and the HAck message. However, it can also be so arranged that the external transmission address relating to the subnet 30 can be acquired at the time of transmitting and receiving of the HI message and the HAck message by the neighbor subnet information acquiring means 2205, 2305 and 2405 in PAR21 of the sixth to the eighth embodiments as given above (PAR21 in each of FIGS. 15, 17 and 19).

12th Embodiment

Next, description will be given on the twelfth embodiment of the present invention. The operation in the twelfth embodiment of the invention is the same as the operation as explained referring to the sequence chart of FIG. 21, and detailed description is not given here.

Figure 31:
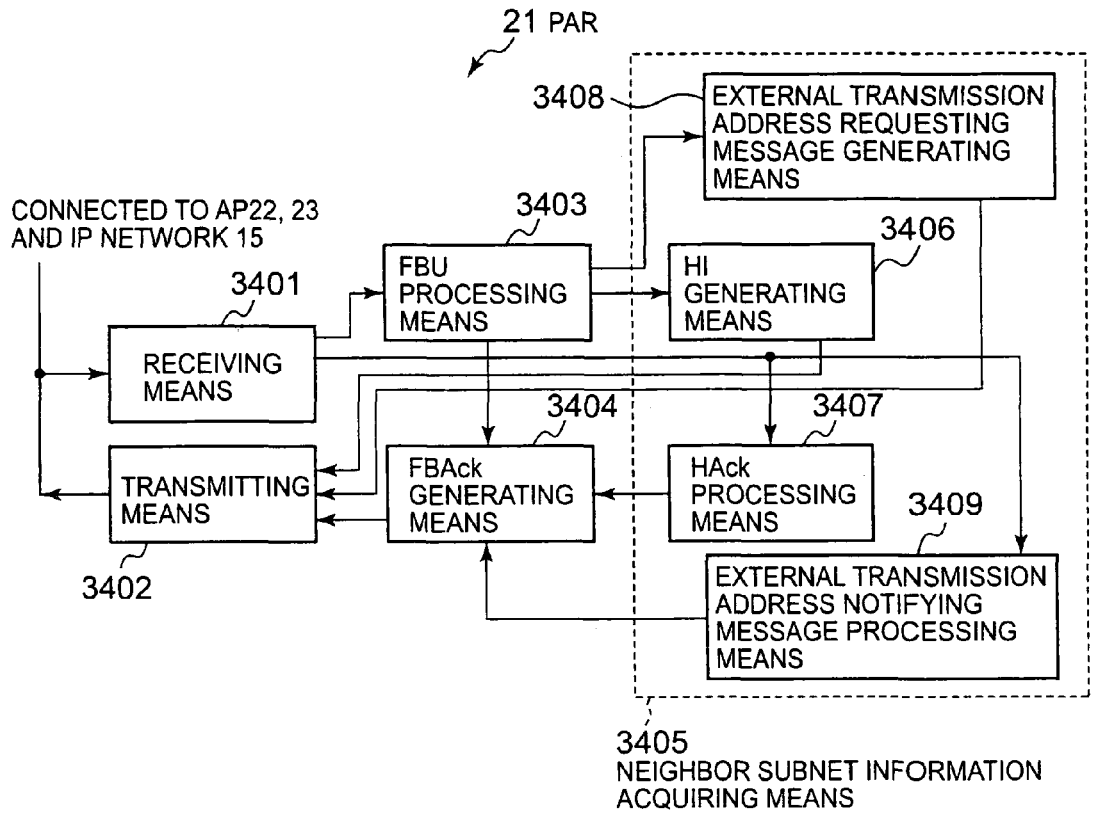
FIG. 31 is a block diagram to show an arrangement of PAR in a twelfth embodiment of the present invention.

FIG. 31 is a block diagram to show an arrangement of PAR in the twelfth embodiment of the invention. Although the functions of PAR21 are shown by blocks in FIG. 31, these functions can be fulfilled by hardware and/or software. PAR21 shown in FIG. 31 comprises receiving means 3401, transmitting means 3402, FBU processing means 3403, FBAck generating means 3404, and neighbor subnet information acquiring means 3405. The neighbor subnet information acquiring means 3405 has the HI generating means 3406 for generating an HI message, HAck processing means 3407 for processing the HAck message, external transmission address requesting message generating means 3408 for generating the external transmission address requesting message to request the external transmission address to NAR31, and external transmission address notifying message processing means 3409 for performing processing of external transmission address notifying message including the external transmission address received from NAR31.

In PAR21 as explained in the twelfth embodiment of the present invention, when a request of the external transmission address is received by FBU message from MN10, HI message and HAck message are given, and PAR21 acquires the external transmission address relating to the subnet 30, which is the handover destination of MN10, by utilizing the transmitting and the receiving of the HI message and the HAck message and transmits the FBAck message including the external transmission address to MN10. Thus, this may be regarded as one aspect of PAR21 as explained in connection with the fifth embodiment in the above.

Description will be given below on the arrangement of PAR21 shown in FIG. 31 by comparing with the arrangement of PAR21 shown in FIG. 13. Similarly to the case of the ninth embodiment as given above, the receiving means 3401, the transmitting means 3402, the FBU processing means 3403, and the FBAck generating means 3404 of PAR31 shown in FIG. 31 are basically the same as the receiving means 2101, the transmitting means 2102, the FBU processing means 2103, and the FBAck generating means 2104 as shown in FIG. 13 respectively.

Also, the HI generating means 3406 and the external transmission address requesting message generating means 3408 of PAR21 shown in FIG. 31 are the same as the HI generating means 3306 and the external transmission address requesting message generating means 3308. Further, the HAck processing means 3407 and the external transmission address notifying message processing means 3409 of PAR21 shown in FIG. 31 are the same as the HAck processing means 3207 and the external transmission address notifying message processing means 3208 as shown in FIG. 25 respectively.

Specifically, the FBU processing means 3403 of PAR21 sends an instruction to generate the HI message to the HI generating means 3406 after processing the FBU message from MN10. It also gives an instruction to generate an external transmission address requesting message to request the external transmission address relating to the subnet 30 to the external transmission address requesting message generating means 3408. Also, it transmits the HI message generated at the HI generating means 3406 and the external transmission address requesting message generated at the external transmission address requesting message generating means 3408.

On the other hand, NAR31 acquires the external transmission address relating to the subnet 30 according to the HI message received from PAR21 and to the external transmission address requesting message. Then, it generates an HAck message, which is a response to the HI message, and also the external transmission address notifying message including the external transmission address relating to the subnet 30 and transmits these messages to PAR21.

Then, PAR21 performs the same processing as the processing in the conventional FMIP to the HI message. With regard to the external transmission address notifying message, it extracts the external transmission address relating to the subnet 30 from the external transmission address notifying message by the external transmission address notifying message processing means 3409 and sends the external transmission address relating to the subnet 30 as extracted to the FBAck generating means 3404. As a result, the FBAck generating means 3404 can generate FBAck message including the external transmission address of the subnet 30.

Figure 32:
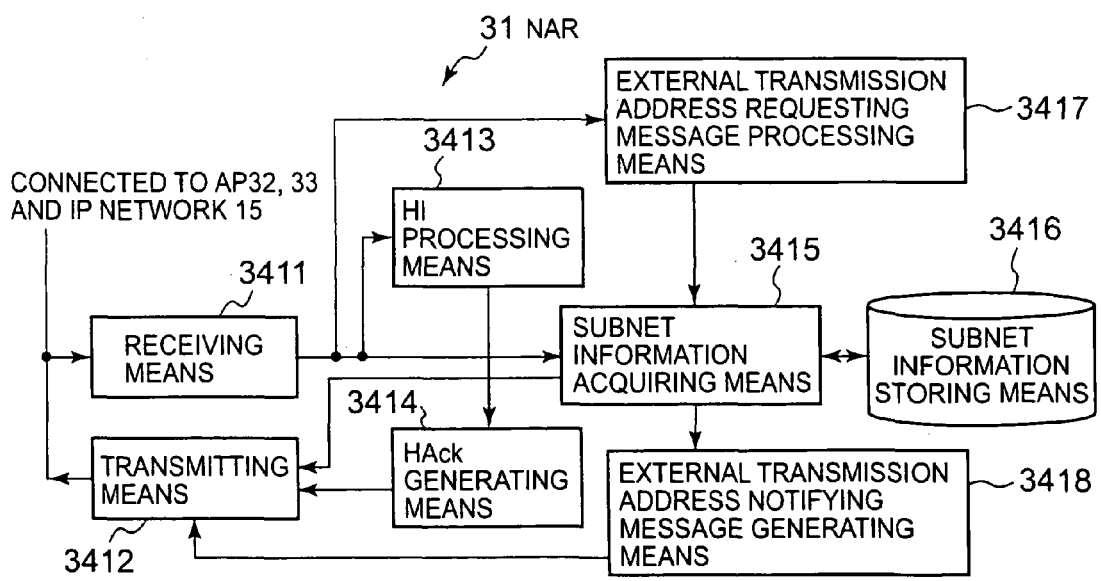
FIG. 32 is a block diagram to show an example of arrangement of NAR in the twelfth embodiment of the present invention.

FIG. 32 is a block diagram to show an example of arrangement of NAR in the twelfth embodiment of the present invention. Although the functions of NAR31 are shown by blocks in FIG. 32, these functions can be fulfilled by hardware and/or software. NAR31 shown in FIG. 32 comprises receiving means 3411, transmitting means 3412, HI processing means 3413, HAck generating means 3414, subnet information acquiring means 3415, subnet information storing means 3416, external transmission address requesting message processing means 3417, and external transmission address notifying message generating means 3418.

The external transmission address requesting message processing means 3417 of NAR31 shown in FIG. 32 is the same as the external transmission address requesting message processing means 3317 of NAR31 shown in FIG. 29, and the external transmission address notifying message generating means 3418 of NAR31 is the same as the external transmission address notifying message generating means 3217 of NAR31 shown in FIG. 26. Specifically, when the HI message and the external transmission address requesting message are received from PAR21, HI processing means 3413 performs processing on the HI message and NAR31 shown in FIG. 32 gives an instruction to generate the HAck message to the HAck generating means 3414. On the other hand, the external transmission address requesting message processing means 3417 receives the external transmission address requesting message and requests the acquisition of the external transmission address relating to the subnet 30 to the subnet information acquiring means 3415. Then, the subnet information acquiring means 3415 acquires the external transmission address relating to the subnet 30 and notifies the result of the acquisition to the external transmission address notifying message generating means 3418. Then, the external transmission address notifying message generating means 3418 can generate the external transmission address notifying message including the external transmission address relating to the subnet 30 different from the HAck message.

Figure 33A:
FIG. 33A represents diagrams to show request information of the external transmission address to be given and taken between PAR shown in FIG. 31 and NAR shown in FIG. 32.
Figure 33B:
FIG. 33B represents diagrams to show an example of data arrangement of a notifying information of the external transmission address to be given and taken between PAR shown in FIG. 31 and NAR shown in FIG. 32.

FIG. 33A represents diagrams to show the request information of the external transmission address to be given and taken between PAR shown in FIG. 31 and NAR31 shown in FIG. 32. FIG. 33B represents diagrams to show an example of data arrangement of the notifying information of the external transmission address to be given and taken between PAR shown in FIG. 31 and NAR shown in FIG. 32. PAR21 is so arranged that it transmits HI message in the conventional FMIP as shown in FIG. 33A and the external transmission address requesting message to NAR31. NAR31 is so arranged that it transmits the HAck message in the conventional FMIP and the external transmission address notifying message to PAR21 as shown in FIG. 33B.

As described above, according to the twelfth embodiment of the present invention, when MN10 executes the handover to different subnets 30, upon receipt of the external transmission address relating to the subnet 30 from MN10, PAR21 requests the external transmission address relating to the subnet 30 by transmitting an external transmission address requesting message different from the HI message to NAR31. Then, NAR31 can notify the external transmission address relating to the subnet 30 by transmitting the external transmission address notifying message different from the HAck message. Then, MN10 acquires the external transmission address relating to the subnet 30 connected after the handover on a link of the subnet 20 connected before the handover, and PAR21 notifies the external transmission address relating to the subnet 30 as acquired, and MN10 can quickly execute packet transmission to outside immediately after the handover.

Description has been given on a case in PAR21 shown in FIG. 31 where, similarly to the case of the ninth embodiment as describe above, PAR21 in the fifth embodiment as given above (PAR21 shown in FIG. 13) can acquire the external transmission address relating to the subnet 30 when the neighbor subnet information acquiring means 2105 transmits and receives the HI message and the HAck message. However, it can also be so arranged that the external transmission address relating to the subnet 30 can be acquired when the HI message and the HAck message is transmitted and received by the neighbor subnet information acquiring means 2205, 2305 and 2405 in PAR21 in the sixth to the eighth embodiments as given above (PAR21 in each of FIGS. 15, 17 and 19).

Also, in the first to the twelfth embodiments as given above, NAR31 belonging to the subnet 30 or other router (e.g. default router 37) can notify, in addition to the external transmission address relating to the subnet 30, an arbitrary information included in the RA message to be sent within the subnet 30.

In particular, the types of information as given below among arbitrary information included in RA message, may be the types of information, which deserve to be provided to MN10 before the handover as additional information. For example, "CureHopLimit", in which the number of hops in the packet to be transmitted from MN10 is defined is information, deserves to be provided to MN10 as additional information. This "CureHopLimit" is information to be described in IPv6 header when MN10 transmits packet, and MN10 must know this value in advance. Also, "RouterLifetime", in which the time to be used as default router is defined, for instance, is information which deserves to be provided to MN10 as additional information. Further, "ReachableTime", in which transmission interval of NS (Neighbor Solicitation) is defined as utilized in Neighbor Unreachability Detection algorithm is also information, which deserves to be used as additional information.

Also, "RetransmissionTime", in which retransmission interval is defined in case, in which there is no response of NS received at "ReachableTime" as used in "Address Resolution or Neighbor Unreachability Detection algorithm" may also be regarded as information, which deserves to be used as additional information. Further, "ValidLifetime", in which usable time of network prefix is defined, may also be regarded as information, which deserves to be used as additional information. Also, "PreferredLifetime", in which the period when the use of network prefix is desirable is defined, may also be regarded as information, which deserves to be used as additional information. Further, "MTU option", in which the length of MTU (Maximum Transmission Unit) of packet transmitted by MN10 is defined, may be regarded as information, which deserves to be used as additional information.

13th Embodiment

Figure 34:
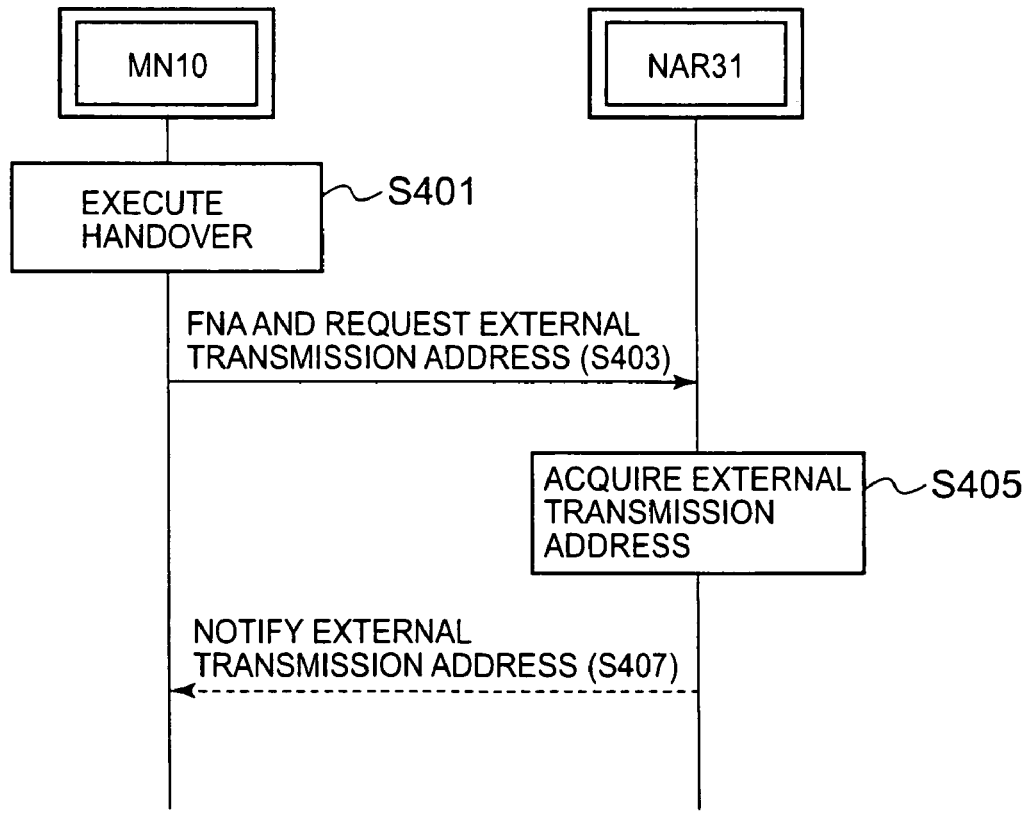
FIG. 34 is a sequence chart to show principal processing common to thirteenth and fourteenth embodiments of the present invention.

Next, description will be given on the thirteenth embodiment of the present invention. FIG. 34 is a sequence chart to show principal processing common to the thirteenth and the fourteenth embodiments of the present invention. The sequence chart shown in FIG. 34 shows only the principal processing according to the present invention, and the technique to be explained in connection with the thirteenth embodiment of the invention can be executed in combination with the first or the second operation mode in FMIP as shown in FIG. 41 and FIG. 42.

In the sequence chart shown in FIG. 34, after MN10 executes L2 handover to the subnet 30 (Step S401), information to request the external transmission address is transmitted in addition to FNA message (Step S403). In the present invention, regardless of whether the FBU message is included in the FNA message transmitted by MN10 or not, any of the first and the second operation modes in the conventional FMIP may be executed.

NAR31 receives the FNA message from MN10 and performs the processing as required (e.g. verification of FNA message or processing to start forwarding the packet in buffering), and it acquires the external transmission address relating to the subnet 30 (Step S405) and notifies the external transmission address to MN10 (Step S407). More concretely, NAR31 notifies the link local address of its own or retrieves access router within the same subnet 30 and acquires and notifies a link local address of a default router 37 belonging to the subnet 30 or it can acquire and notify a link local address of the default router 37 belonging to the subnet 30 from the information already retrieved (information retained at NAR31).

As a result, MN10 can acquire the external transmission address relating to the subnet 30 from NAR31 immediately after the handover. That is, MN10 can quickly execute packet transmission to outside (e.g. CN40) in the subnet 30 by setting up a link local address of NAR31 acquired by the above procedure or a link local address of the default router 37 in the transmission packet immediately after executing the handover to the link of the subnet 30.

Figure 35:
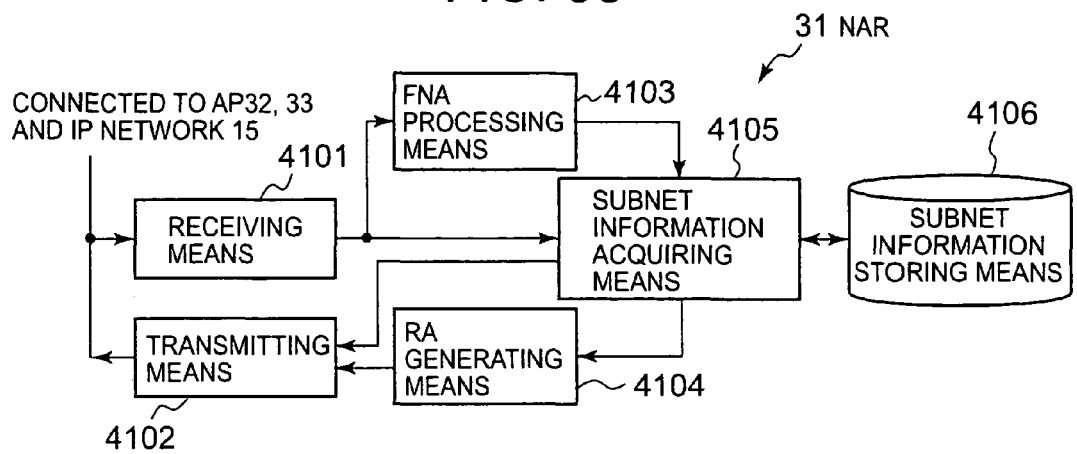
FIG. 35 is a block diagram to show an example of arrangement of NAR in the thirteenth embodiment of the present invention.

FIG. 35 is a block diagram to show an example of the arrangement of NAR in the thirteenth embodiment of the present invention. Although the functions of NAR31 are shown by blocks in FIG. 35, these functions can be fulfilled by hardware and/or software. NAR31 shown in FIG. 35 comprises receiving means 4101, transmitting means 4102, FNA processing means 4103, RA generating means 4104, subnet information acquiring means 4105, and subnet information storing means 4106.

The FNA message received from MN10 by NAR31 is processed by the FNA processing means 4103, and an instruction to acquire the external transmission address relating to the subnet 30 is given to the subnet information acquiring means 4105 from the FNA processing means 4103. The subnet information acquiring means 4105 acquires the external transmission address relating to the subnet 30 by communicating with the router in the subnet or by reading the information stored in the subnet information storing means 4106, and the result of the acquisition is notified to the RA generating means 4104. The RA generating means 4104 generates an RA (Router Advertisement) message including the external transmission address relating to the subnet 30 and transmits it to MN10. As a result, MN10 can quickly acquire the external transmission address relating to the subnet 30 immediately after executing the handover to the link of a new subnet 30.

Figure 36A:
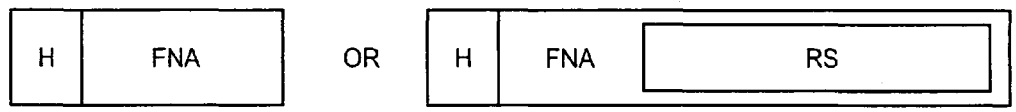
FIG. 36A represents diagrams to show request information of the external transmission address from MN to be processed in NAR shown in FIG. 35.
Figure 36B:
FIG. 36B represents a diagram to show an example of data arrangement of a notifying information of the external transmission address to be transmitted to MN and processed in NAR shown in FIG. 35.

FIG. 36A represents diagrams to show the request information of the external transmission address from MN to be processed in NAR shown in FIG. 35. FIG. 36B is a diagram to show an example of data arrangement of the notifying information of the external transmission address to be transmitted to MN and processed in NAR shown in FIG. 35. As shown in FIG. 36A, NAR31 receives a conventional FNA message (In this case, the conventional FNA message plays a role of information to request the external transmission address) or an FNA message including a request of the external transmission address (e.g. information belonging to RS (Router Solicitation) message). Then, it transmits an RA message including the conventional external transmission address as shown in FIG. 36B.

Therefore, in case where it is so arranged that the RA message is transmitted to MN10, to which NAR31 has sent an FNA message added with the information to instruct the request of the external transmission address, MN10 must have the means to insert the information to instruct the request of the external transmission address within the FNA message, although not shown in the figures.

As described above, according to the thirteenth embodiment of the present invention, when MN10 executes the handover to different subnets 30, MN10 requests the external transmission address relating to the subnet 30 by transmitting the FNA message to NAR31 and can notify the external transmission address relating to the subnet 30 by transmitting the RA message to MN10 in response to this request. Then, MN10 can acquire the external transmission address relating to the subnet 30 to be newly connected immediately after the handover and can quickly execute packet transmission to outside.

14th Embodiment

Next, description will be given on the fourteenth embodiment of the present invention. The operation in the fourteenth embodiment of the present invention is the same as the operation as explained above referring to the sequence chart of FIG. 34, and detailed description is not given here.

Figure 37:
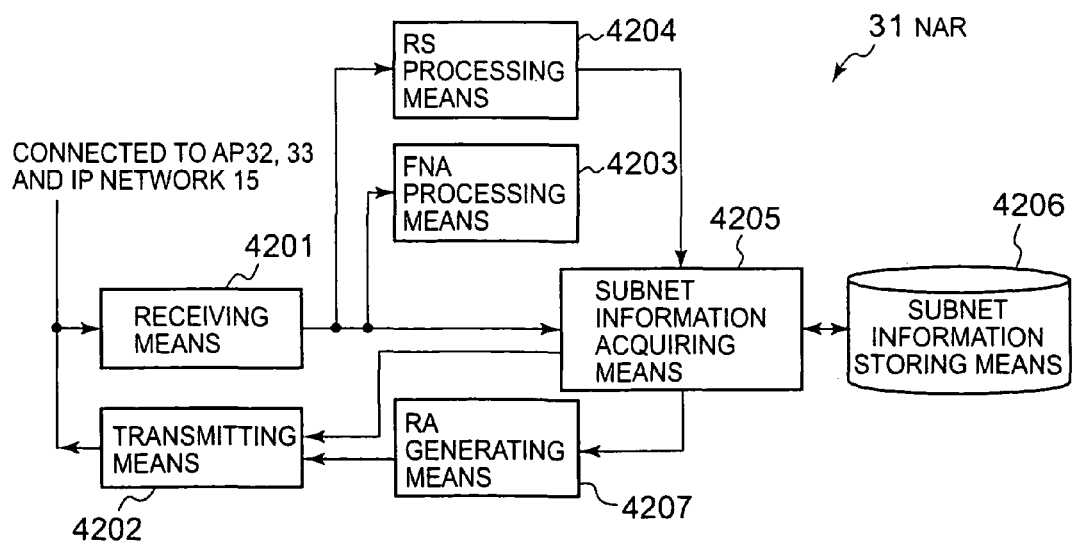
FIG. 37 is a block diagram to show an example of arrangement of NAR in the fourteenth embodiment of the present invention.

FIG. 37 is a block diagram to show an example of arrangement of NAR in the fourteenth embodiment of the present invention. Although the functions of NAR31 are shown by blocks in FIG. 37, these functions can be fulfilled by hardware and/or software. NAR31 shown in FIG. 37 comprises receiving means 4201, transmitting means 4202, FNA processing means 4203, RS processing means 4204, subnet information acquiring means 4205, subnet information storing means 4206, and RA generating means 4207. NAR31 shown in FIG. 37 has almost the same arrangement as that of the conventional access router, while it differs in that it can also generate the RA message including not only a link local address of NAR31 but also a link local address of a default router 37 of the subnet 30, to which NAR31 belongs. Also, it is also possible to use a conventional access router, which notifies only the link local address of NAR31 itself as NAR31.

Figure 38A:
FIG. 38A represents diagrams to show request information of the external transmission address from MN to be processed in NAR shown in FIG. 37.
Figure 38B:
FIG. 38B is a diagram to indicate an example of data arrangement of a notifying information of the external transmission address to be transmitted to MN and processed in NAR shown in FIG. 37.

FIG. 38A represents diagrams to show the request information of the external transmission address from MN to be processed in NAR shown in FIG. 37. FIG. 38B is a diagram to show an example of data arrangement of the notifying information of the external transmission address transmitted to MN as to be processed in NAR shown in FIG. 37. As shown in FIG. 38B, the RA message including the external transmission address relating to the subnet 30 is transmitted to MN10.

Figure 39:
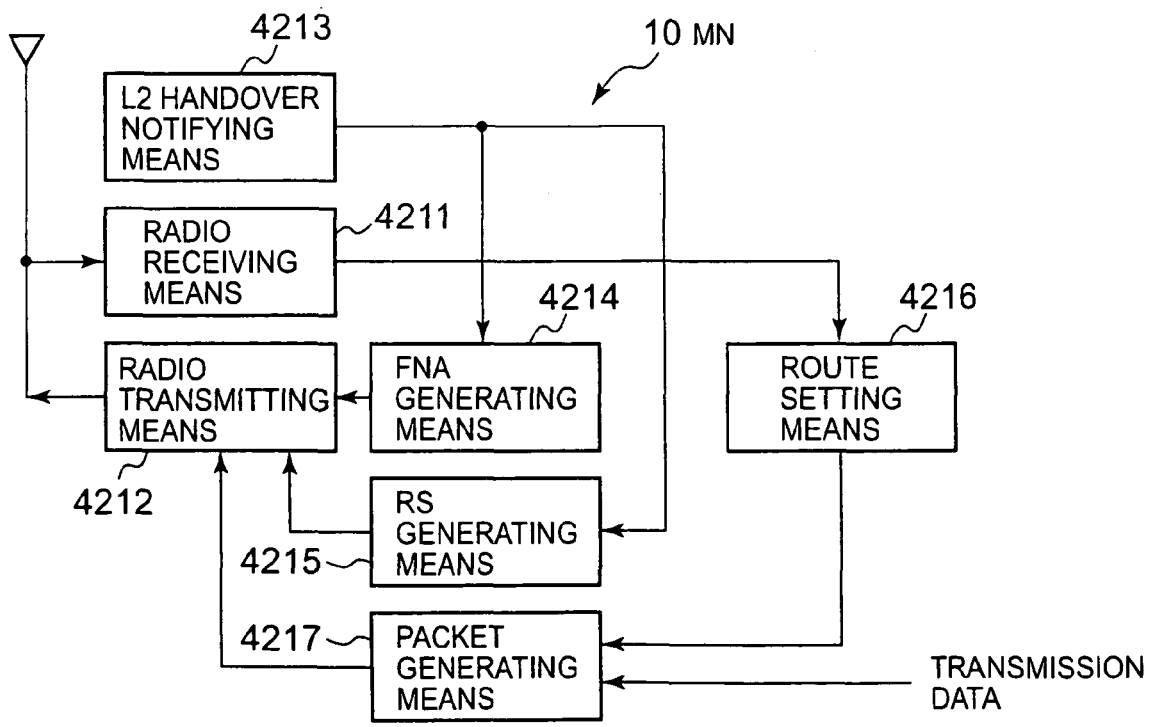
FIG. 39 is a block diagram to show an example of arrangement of MN in the fourteenth embodiment of the present invention.

FIG. 39 is a block diagram to show an example of arrangement of MN in the fourteenth embodiment of the present invention. Although the functions of MN10 are shown by blocks in FIG. 39, these functions can be fulfilled by hardware and/or software. MN10 shown in FIG. 39 comprises radio receiving means 4211, radio transmitting means 4212, L2 handover notifying means 4213, FNA generating means 4214, RS generating means 4214, route setting means 4216, and packet generating means 4217.

In case information to indicate that L2 handover is executed by the L2 handover notifying means 4213 has been notified to the FNA generating means 4214 and the RS generating means 4215, the FNA generating means 4214 and the RS generating means 4215 generate the FNA message and the RS message independently from each other and transmit the message to NAR31 via the radio transmitting means 4212.

NAR31 processes the FNA message and the RS message received from MN10 via the receiving means 4201 at the FNA processing means 4203 and the RS processing means 4204. At the FNA processing means 4203, the same processing as the processing of the FNA message in the conventional FMIP is performed. Also, the RS processing means 4204 notifies the receiving of RS from MN10 to the subnet information acquiring means 4205. Taking the opportunity of this notification, the external transmission address relating to the subnet 30 as acquired at the subnet information acquiring means 4205 is supplied to the RA generating means 4207. The RA generating means 4207 generates an RA message including the external transmission address relating to the subnet 30 and transmits it to MN10 via the transmitting means 4202.

MN10 receives RA message from NAR31 via the radio receiving means 4211. Then, at the route setting means 4216, it extracts a link layer address of NAR31 and/or of a default router 37 from within the RA message and sets up this link layer address as a route to send the packet outside of the subnet 30, for instance. As a result, when the transmission data is packetized at the packet generating means 4217, for instance, MN10 acquires the external transmission address relating to the subnet 30 newly connected immediately after the handover by setting the external transmission address at the header of the transmission packet and can quickly execute packet transmission to outside.

As described above, according to the fourteenth embodiment of the present invention, when MN10 executes the handover to different subnets 30, it can request the external transmission address relating to the subnet 30 by transmitting the RS message together with the FNA message to NAR31. In response to this request, NAR31 can notify the external transmission address relating to the subnet 30 by transmitting the RA message to MN10. MN10 can acquire the external transmission address relating to the subnet 30 newly connected immediately after the handover and can quickly execute packet transmission to outside.

15th Embodiment

Figure 40:
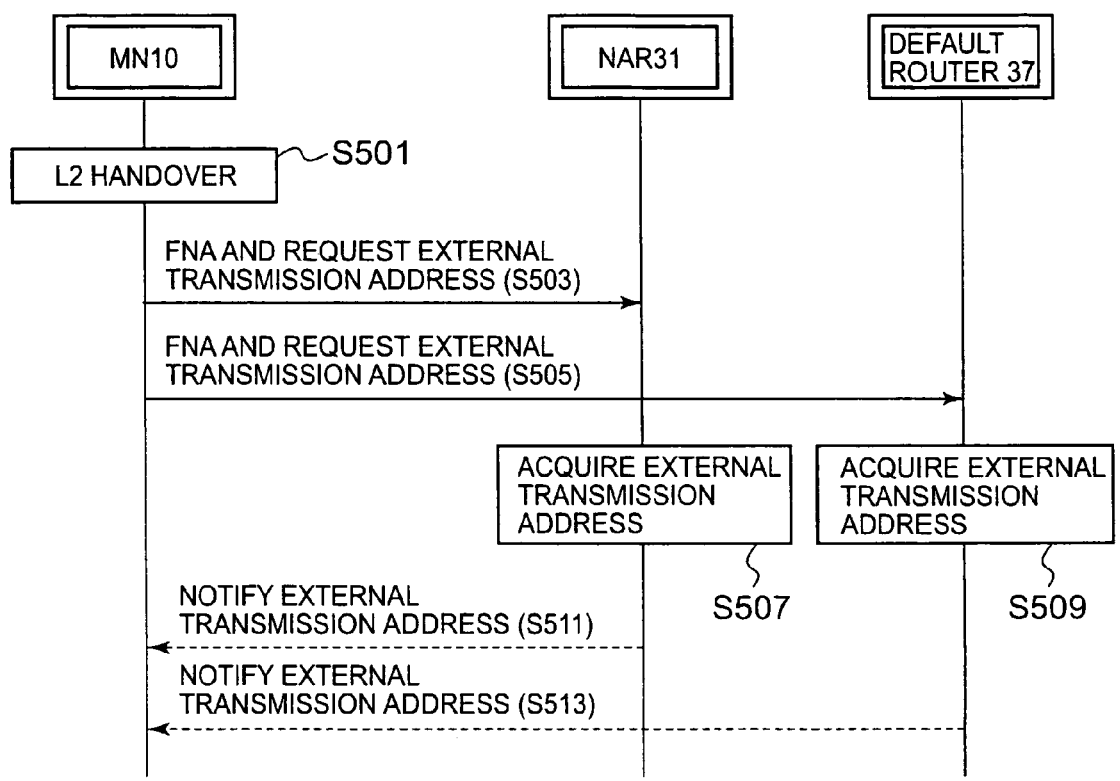
FIG. 40 is a sequence chart to show principal processing in a fifteenth embodiment of the present invention.

Next, description will be given on the fifteenth embodiment of the present invention. FIG. 40 is a sequence chart to show principal processing in the fifteenth embodiment of the invention. Compared with the sequence chart of FIG. 34, the sequence chart of FIG. 40 is different in that, by multi-casting the FNA message and/or the RS message, the FNA message and/or the RS message can reach not only NAR31 but also a plurality of routers within the subnet 30 including a default router 37 (Steps S503 and S505), and the RA message is transmitted to MN10 from the plurality of routers (Steps S511 and S513).

In this case, MN10 receives the RA message from a plurality of routers. In the RA message sent from each router, various types of information such as information to identify the default router 37 are described. Therefore, MN10 can identify the default router 37 from the information in the RA message received from each router and can acquire the link local address of the default router 37.

For instance, in the thirteenth and the fourteenth embodiments as given above, in case it is so arranged that, when at least one of the FNA message or the FNA message including the request of the external transmission address of the RS message is multi-cast within the subnet 30 from MN10 and when a router present in the subnet 30 (in particular, NAR31 and the default router 37) receives the message, and the RA message including the link layer address of its own router is transmitted to MN10 or is sent in multi-cast, and the fifteenth embodiment of the present invention can be achieved. In case the link local address of the default router 37 is notified from the default router 37 to MN10, it is not necessary to arrange so that the link local address of the default router 37 is notified from NAR31 to MN10.

INDUSTRIAL APPLICABILITY

The communication system, the mobile terminal, and the access router according to the present invention can provide such effects that the mobile terminal can quickly execute packet transmission to outside immediately after the handover when executing the handover between subnets. This technique can be applied to the handover to perform continuous IP communication. In particular, it is useful for the application in the communication system provided with FMIP or in case the mobile terminal executes data distribution.

The invention claimed is:
1. A communication system, comprising a first access router belonging to a first subnet, and a second access router belonging to a second subnet different from said first subnet, said first access router and said second access router being connected via an IP network, and a mobile terminal connected to said first subnet or said second subnet via radio communication, wherein:

the mobile terminal connected to said first subnet requests a link local address of a default router in said second subnet from said second access router immediately after executing a handover to said second subnet, and acquires said link local address of said default router which is different from said second access router from said second access router.

2. A communication system, comprising a first access router belonging to a first subnet, and a second access router belonging to a second subnet different from said first subnet, said first access router and said second access router being connected via an IP network, and a mobile terminal connected to said first subnet or said second subnet via radio communication, wherein:

the mobile terminal connected to said first subnet requests a link local address of a default router in said second subnet from said second access router when transmitting a message V to notify a connection to said second subnet immediately after executing a handover to said second subnet, and acquires said link local address of said default router which is different from said second access router from said second access router.

3. The communication system according to claim 2, wherein said mobile terminal is so arranged that information to request said link local address of said default router is added within said message V, and said second access router is so arranged that an RA message including said link local address of said default router is transmitted to said mobile terminal.

4. The communication system according to claim 2, wherein said mobile terminal is so arranged that information to request said link local address of said default router different from said message V is transmitted to said second access router, and said second access router is so arranged that an RA message including said link local address of said default router is transmitted to said mobile terminal.

5. A communication system, comprising a first access router belonging to a first subnet, and a second access router belonging to a second subnet different from said first subnet, said first access router and said second access router being connected via an IP network, and a mobile terminal connected to said first subnet or said second subnet via radio communication, wherein:

the mobile terminal connected to said first subnet transmits a message V to notify a connection to said second subnet to said second router immediately after executing a handover to said second subnet, and acquires a link local address of a default router in said second subnet from said second access router, said default router being different from said second access router; and said second access router is arranged to transmit an RA message including said link local address of said default router when receiving said message V to notify the Connection to said second subnet from said mobile terminal.

6. A mobile terminal, to be used in a communication system comprising a first access router belonging to a first subnet, and a second access router belonging to a second subnet different from said first subnet, said first access router and said second access router being connected via an IP network, wherein the mobile terminal is connected to said first subnet or said second subnet via radio communication, the mobile terminal comprising:

a requesting unit for requesting a link local address of a default router in said second subnet from said second access router immediately after executing a handover from said first subnet to said second subnet; and an acquiring unit for acquiring said link local address of said default router which is different from said second access router from said second access router.

7. A mobile terminal, to be used in a communication system comprising a first access router belonging to a first subnet, and a second access router belonging to a second subnet different from said first subnet, said first access router and said second access router being connected via an IP network, wherein the mobile terminal is connected to said first subnet or said second subnet via radio communication, the mobile terminal comprising:

a requesting unit for requesting a link local address of a default router in said second subnet from said second access router when transmitting a message V to notify a connection to said second subnet immediately after executing a handover from said first subnet to said second subnet; and an acquiring unit for acquiring said link local address of said default router which is different from said second access router from said second access router.

8. The mobile terminal according to claim 7, further comprising:

an adding unit for adding information to request said link local address of said default router within said message V; and a receiving unit for receiving an RA message including said link local address of said default router from said second access router.

9. The mobile terminal according to claim 7, further comprising:

a transmitting unit for transmitting information to request said link local address of said default router different from said message V to said second access router; and a receiving unit for receiving an RA message including said link local address of said default router from said second access router.

10. A mobile terminal, to be used in a communication system comprising a first access router belonging to a first subnet, and a second access router belonging to a second subnet different from said first subnet, said first access router and said second access router being connected via an IP network, wherein the mobile terminal is connected to said first subnet or said second subnet via radio communication, the mobile terminal comprising:

a transmitting unit for transmitting, to said second access router, a message V to notify a connection to said second subnet immediately after executing a handover from said first subnet to said second subnet; and a receiving unit for receiving an RA message including a link local address of a default router in said second subnet from said second access router which has received said message V, said default router being different from said second access router.

11. An access router in a communication system, being a second access router belonging to a second subnet different from a first subnet, to which a first access router belongs, said second router being connected to said first access router via an IP network and capable of being connected to a mobile terminal via radio communication, wherein said access router comprises:

a receiving unit for receiving information to request a link local address of a default router in said second subnet from said mobile terminal, said mobile terminal transmitting said information immediately after executing a handover from said first subnet to said second subnet;

an acquiring unit for acquiring said link local address of said default router which is different from said second access router; and a transmitting unit for transmitting an RA message including said link local address of said default router to said mobile terminal when receiving said information to request said link local address of said default router.

12. An access router in a communication system, being a second access router belonging to a second subnet different from a first subnet, to which a first access router belongs, said access router being connected to said first access router via an IP network and capable of being connected to a mobile terminal via radio communication, wherein said access router comprises:

an accepting unit for accepting a request for a link local address of a default router in said second subnet from said mobile terminal when receiving, from said mobile terminal, a message V to notify a connection to said second subnet immediately after said mobile terminal executes a handover from said first subnet to said second subnet;

an acquiring unit for acquiring said link local address of said default router which is different from said second access router; and a transmitting unit for transmitting an RA message including said link local address of said default router to said mobile terminal when accepting said request for said link local address of said default router.

13. The access router according to claim 12, which is so arranged to transmit said RA message including said link local address of said default router to said mobile terminal when receiving said message V where information to request said link local address of said default router is added.

14. The access router according to claim 12, which is so arranged to transmit said RA message including said link local address of said default router to said mobile terminal when receiving information to request said link local address of said default router different from said message V.

15. An access router in a communication system, being a second access router belonging to a second subnet different from a first subnet, to which a first access router belongs, said access router being connected to said first access router via an IP network and capable of being connected to a mobile terminal via radio communication, wherein said access router comprises:

a receiving unit for receiving, from said mobile terminal, a message V to notify a connection to said second subnet immediately after said mobile terminal executes a handover from said first subnet to said second subnet;

an acquiring unit for acquiring a link local address of a default router in said second subnet, said default router being different from said second access router; and a transmitting unit for transmitting an RA message including said link local address of said default router to said mobile terminal when receiving said message V.

* * * * *